(12) United States Patent
Ueno et al.

(10) Patent No.: US 9,111,382 B2
(45) Date of Patent: Aug. 18, 2015

(54) DISPLAY DEVICE, CONTROL SYSTEM, AND STORAGE MEDIUM STORING CONTROL PROGRAM

(75) Inventors: Yasuhiro Ueno, Yokohama (JP); Shigeki Tanabe, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 375 days.

(21) Appl. No.: 13/532,918

(22) Filed: Jun. 26, 2012

(65) Prior Publication Data

US 2013/0005420 A1    Jan. 3, 2013

(30) Foreign Application Priority Data

Jun. 28, 2011  (JP) .................................. 2011-143342

(51) Int. Cl.
| | |
|---|---|
| *G06T 15/00* | (2011.01) |
| *G06T 19/00* | (2011.01) |
| *G06F 3/0346* | (2013.01) |
| *A63F 9/08* | (2006.01) |
| *A63F 13/00* | (2014.01) |

(52) U.S. Cl.
CPC ............ *G06T 19/006* (2013.01); *G06F 3/0346* (2013.01); *A63F 9/0826* (2013.01); *A63F 13/005* (2013.01); *A63F 2300/1075* (2013.01); *A63F 2300/1087* (2013.01); *A63F 2300/30* (2013.01); *A63F 2300/8094* (2013.01)

(58) Field of Classification Search
CPC ......... G06F 3/017; G06F 3/005; G06F 3/011; G06F 3/0414; G06F 3/0425; G06F 3/0346; G06F 3/0488; G06F 2203/04802; G06F 3/04845; G06K 9/00335; G06T 19/006
See application file for complete search history.

(56) References Cited

U.S. PATENT DOCUMENTS

| | | | |
|---|---|---|---|
| 6,243,054 B1 | 6/2001 | DeLuca | |
| 7,862,415 B1 * | 1/2011 | Ghaly | ................................ 463/9 |
| 2007/0132721 A1 | 6/2007 | Glomski et al. | |
| 2007/0152958 A1 * | 7/2007 | Ahn et al. | ...................... 345/156 |
| 2010/0134411 A1 | 6/2010 | Tsumura et al. | |
| 2010/0315413 A1 | 12/2010 | Izadi et al. | |
| 2011/0109577 A1 | 5/2011 | Lee et al. | |
| 2011/0148918 A1 | 6/2011 | Ishizawa et al. | |
| 2011/0310100 A1 * | 12/2011 | Adimatyam et al. | ......... 345/420 |
| 2012/0032917 A1 * | 2/2012 | Yamaguchi | .................... 345/174 |
| 2012/0268410 A1 | 10/2012 | King et al. | |
| 2012/0306856 A1 | 12/2012 | Tada | |

FOREIGN PATENT DOCUMENTS

| | | |
|---|---|---|
| JP | 2007-086931 A | 4/2007 |
| JP | 2011095547 A | 5/2011 |
| JP | 2011101677 A | 5/2011 |

OTHER PUBLICATIONS

Office Action mailed Oct. 28, 2014, corresponding to Japanese Patent Application No. 2011-143070, for which an explanation of relevance is attached.

* cited by examiner

*Primary Examiner* — Mark Zimmerman
*Assistant Examiner* — Nurun N Flora
(74) *Attorney, Agent, or Firm* — Lowe Hauptman & Ham, LLP

(57) ABSTRACT

According to an aspect, a display device includes a display unit, a detecting unit, and a control unit. The display unit stereoscopically displays an aggregation of a plurality of cubes in three-dimensional space. The cubes are arranged along three directions perpendicular to one another. The detecting unit detects moves of objects in the three-dimensional space. The control unit changes a location of each of the cubes according to a detection result of the detecting unit.

14 Claims, 25 Drawing Sheets

DISPLAY DEVICE, CONTROL SYSTEM, AND STORAGE MEDIUM STORING CONTROL PROGRAM

CROSS-REFERENCE TO RELATED APPLICATIONS

This application claims priority from Japanese Application No. 2011-143342, filed on Jun. 28, 2011, the content of which is incorporated by reference herein in its entirety.

BACKGROUND OF THE INVENTION

1. Technical Field

The present disclosure relates to a display device, a control system, and a storage medium storing therein a control program.

2. Description of the Related Art

Some display devices with a display unit such as mobile phones can stereoscopically display an image and so on (see e.g., Japanese Patent Application Laid-Open No. 2011-95547). The three-dimensional (3D) display is implemented by using binocular disparity.

In addition, there are gaming devices capable of executing applications of three-dimensional games (see e.g., Japanese Patent Application Laid-Open No. 2011-101677). For example, the gaming device described in Japanese Patent Application Laid-Open No. 2011-101677 executes a 3D game using a three-dimensional puzzle displayed in three-dimensional computer graphics.

The three-dimensional display is a user-friendly display form; however, it is used just for viewing purposes, and is not used for improving the convenience of operations. Although there are applications for 3D games such as three-dimensional puzzles, a selection is made only for each specific single object using an operation button or so, and therefore it takes more time for users to get used to operations.

For the foregoing reasons, there is a need for a display device, a control system, and a storage medium storing therein a control program that can provide a more convenient operation method in 3D application to users.

SUMMARY OF THE INVENTION

According to an aspect, a display device includes a display unit, a detecting unit, and a control unit. The display unit stereoscopically displays an aggregation of a plurality of cubes in three-dimensional space. The cubes are arranged along three directions perpendicular to one another. The detecting unit detects moves of objects in the three-dimensional space. The control unit changes a location of each of the cubes according to a detection result of the detecting unit.

According to another aspect, a display device includes a display unit, a detecting unit, and a control unit. The display unit stereoscopically displays a three-dimensional puzzle in three-dimensional space. The detecting unit detects moves of objects in the three-dimensional space. The control unit changes a location of each of pieces of the three-dimensional puzzle according to a detection result of the detecting unit.

According to another aspect, a control system includes a mobile device and a control device. The mobile device includes a display unit and a detecting unit. The display unit stereoscopically displays an aggregation of a plurality of cubes in three-dimensional space. The cubes are arranged along three directions perpendicular to one another. The detecting unit detects moves of objects in the three-dimensional space. The control device includes a control unit. The control unit changes a location of each of the cubes according to a detection result of the detecting unit.

According to another aspect, a non-transitory storage medium stores therein a control program. When executed by a display device including a display unit and a detecting unit, the control program causes the display device to execute: stereoscopically displaying an aggregation of a plurality of cubes in three-dimensional space by the display unit, the cubes being arranged along three directions perpendicular to one another; detecting moves of objects in the three-dimensional space by the detecting unit; and changing a location of each of the cubes according to a detection result of the detecting unit.

DETAILED DESCRIPTION OF THE PREFERRED EMBODIMENTS

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of the display device; however, the present invention is not limited to mobile phones. Therefore, the present invention can be applied to a variety of devices, including but not limited to personal handyphone systems (PHS), personal digital assistants (PDA), portable navigation units, personal computers (including but not limited to tablet computers, netbooks etc.), media players, portable electronic reading devices, and gaming devices. Also, in the followings description, a regular hexahedral three-dimensional puzzle (so-called Rubik's Cube and so on) will be explained below as an example of the three-dimensional object; however, the three-dimensional object is not limited to the regular hexahedral three-dimensional puzzles. Therefore, the three-dimensional object may be any types of three-dimensional puzzles known by persons skilled in the art.

Figure 1:
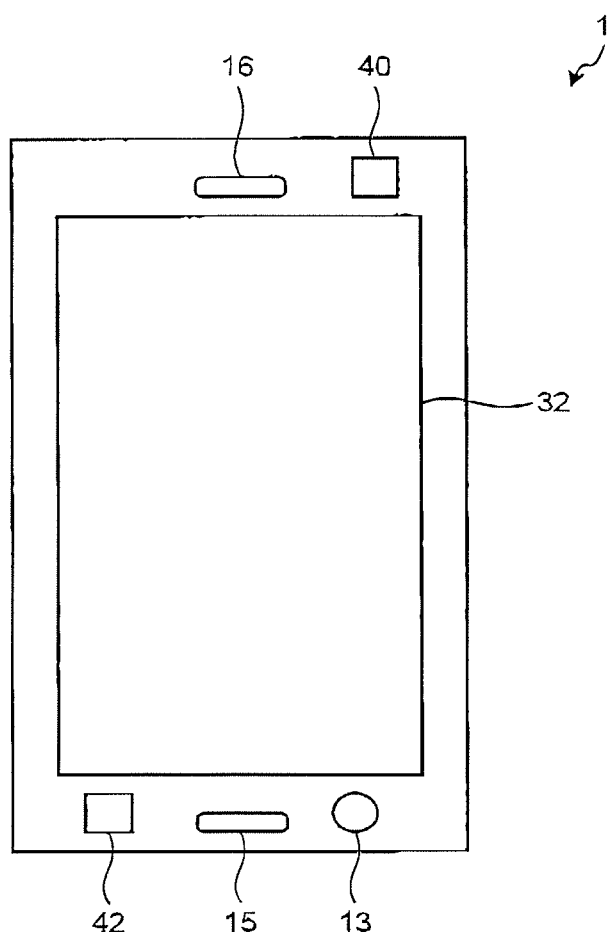
FIG. 1 is a front view of a mobile phone according to a first embodiment.
Figure 2:
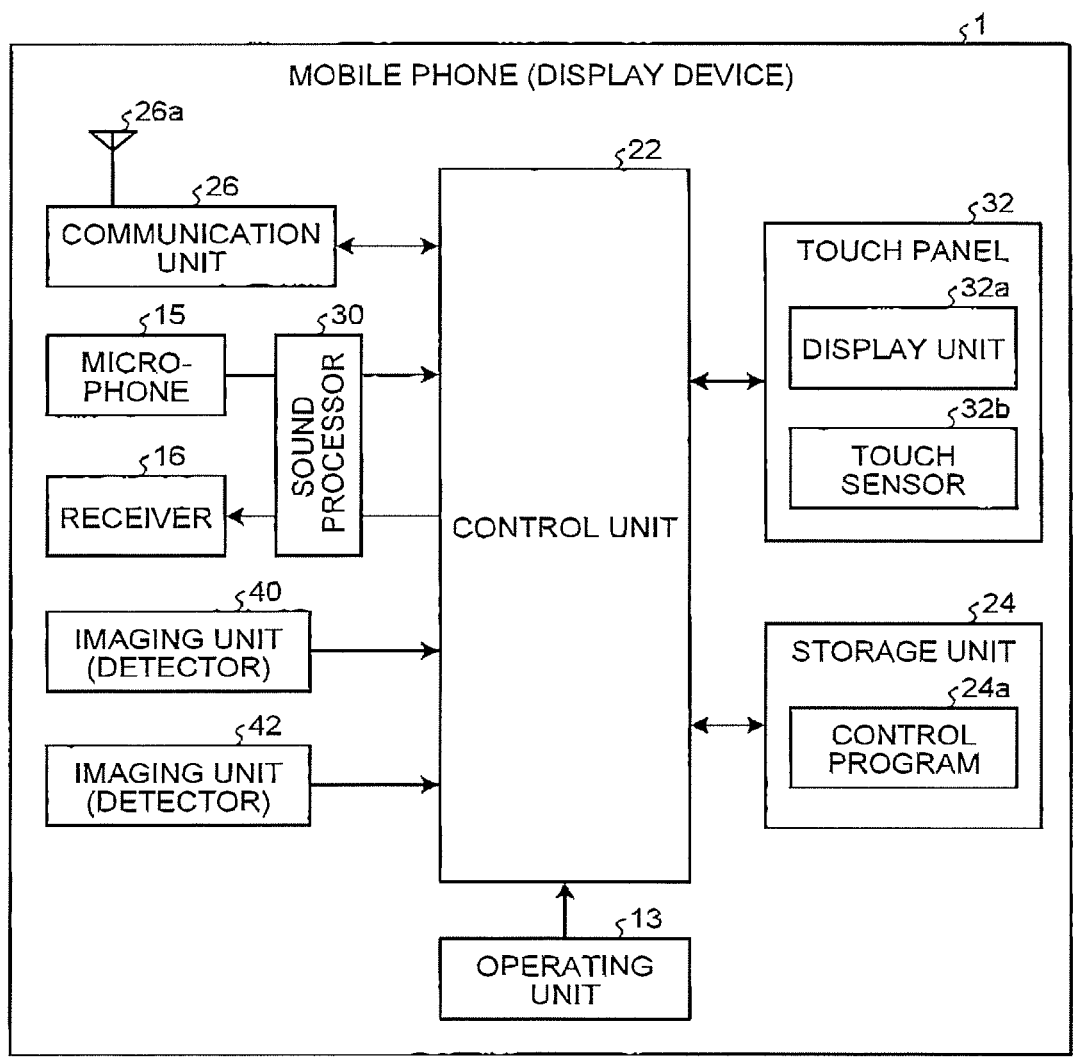
FIG. 2 is a block diagram of the mobile phone according to the first embodiment.

First of all, a configuration of a mobile phone (display device) 1 according to a first embodiment is explained below with reference to FIG. 1 and FIG. 2. FIG. 1 is a front view of the mobile phone 1. FIG. 2 is a block diagram of the mobile phone 1.

As illustrated in FIG. 1 and FIG. 2, the mobile phone 1 includes an operating unit 13, a microphone 15, a receiver 16, a control unit 22, a storage unit 24, a communication unit 26, a sound processor 30, a touch panel 32, an imaging unit 40, and an imaging unit 42. Respective parts of the operating unit 13, the microphone 15, the receiver 16, the touch panel 32, and the imaging units 40 and 42 are exposed to the front surface of the mobile phone 1.

The operating unit 13 has physical buttons, and outputs a signal corresponding to a pressed button to the control unit 22. In the example illustrated in FIG. 1, the operating unit 13 has only one button, however, may have a plurality of buttons.

The microphone 15 acquires an external sound. The receiver 16 outputs a voice of a call partner during a phone call. The sound processor 30 converts the sound input from the microphone 15 to a digital signal and outputs the digital signal to the control unit 22. The sound processor 30 also decodes a digital signal input from the control unit 22 and outputs the decoded signal to the receiver 16.

The communication unit 26 includes an antenna 26a, and establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 26.

The touch panel 32 displays various pieces of information such as characters, graphics, and images, and detects an input operation performed on a predetermined area such as displayed icon, button, and character input area. The touch panel 32 is structured with a display unit 32a and a touch sensor 32b so as to overlap each other.

The display unit 32a includes a display device such as a liquid crystal display (LCD) or an organic electro-luminescence display (OELD), and displays various pieces of information according to a control signal input from the control unit 22. The touch sensor 32b detects an input operation performed on the surface of the touch panel 32, and outputs a signal corresponding to the detected input operation to the control unit 22. The detection method in which the touch sensor 32b detects various operations may be any detection method, such as a capacitive type detection method, a resistive type detection method, and a pressure sensitive type detection method.

The touch panel 32 can display a three-dimensional object. A "three-dimensional object" is a display object such as an image and a shape created so as to look as if the display object is three-dimensional using disparity. The method of displaying the three-dimensional object may be a method of realizing a stereoscopic vision using a tool such as glasses, or may be a method of realizing a stereoscopic vision with the naked eye.

The imaging units 40 and 42 electronically photograph images using an image sensor such as a charge-coupled device (CCD) image sensor or a complementary metal oxide semiconductor (CMOS) image sensor. Each of the imaging units 40 and 42 converts the photographed image to a signal and outputs the signal to the control unit 22. The imaging units 40 and 42 also function as a detector that detects an object for selecting and operating a three-dimensional object in a space in which the three-dimensional object is stereoscopically displayed (hereinafter, also referred to "three-dimensional space", "stereoscopic vision space" or "visual space").

The imaging units 40 and 42 are configured to set a field angle and layout so that, even if an object such as a finger is located in any part of the three-dimensional space, the object can be photographed. The imaging units 40 and 42 may be a device that acquires an image of visible light or may be a device that acquires an image of invisible light such as infrared rays.

The control unit 22 includes a central processing unit (CPU) being a computing unit and a memory being a storage unit, and implements various functions by executing programs using these hardware resources. Specifically, the control unit 22 reads a program or data stored in the storage unit 24 to load it to the memory, and causes the CPU to execute instructions contained in the program loaded to the memory. The control unit 22 performs read/write of data from/to the memory and the storage unit 24 and controls operations of the communication unit 26, the display unit 32a, and the like according to execution results of the instructions executed by the CPU. When the CPU executes instructions, the data loaded to the memory and the signal input from the touch sensor 32b or so are used as part of parameters and determination conditions.

The storage unit 24 includes one or more non-transitory storage medium, for example, a nonvolatile memory (such as ROM, EPROM, flash card etc.) and/or a storage device (such as magnetic storage device, optical storage device, solid-state storage device etc.), and stores therein various programs and data. Examples of the programs stored in the storage unit 24 include a control program 24a. The storage unit 24 may include a combination of a portable storage medium such as a memory card and a reader/writer for reading/writing data from/to the storage medium. In this case, the control program 24a may be previously stored in the storage medium. The control program 24a may also be acquired from any other device such as a server through communication by the communication unit 26.

The control program 24a provides functions for various controls to operate the mobile phone 1. The function provided by the control program 24a includes a function for controlling a display of a three-dimensional object on the touch panel 32 and a function for detecting a user's operation performed for the three-dimensional object displayed by the touch panel 32.

Figure 3:
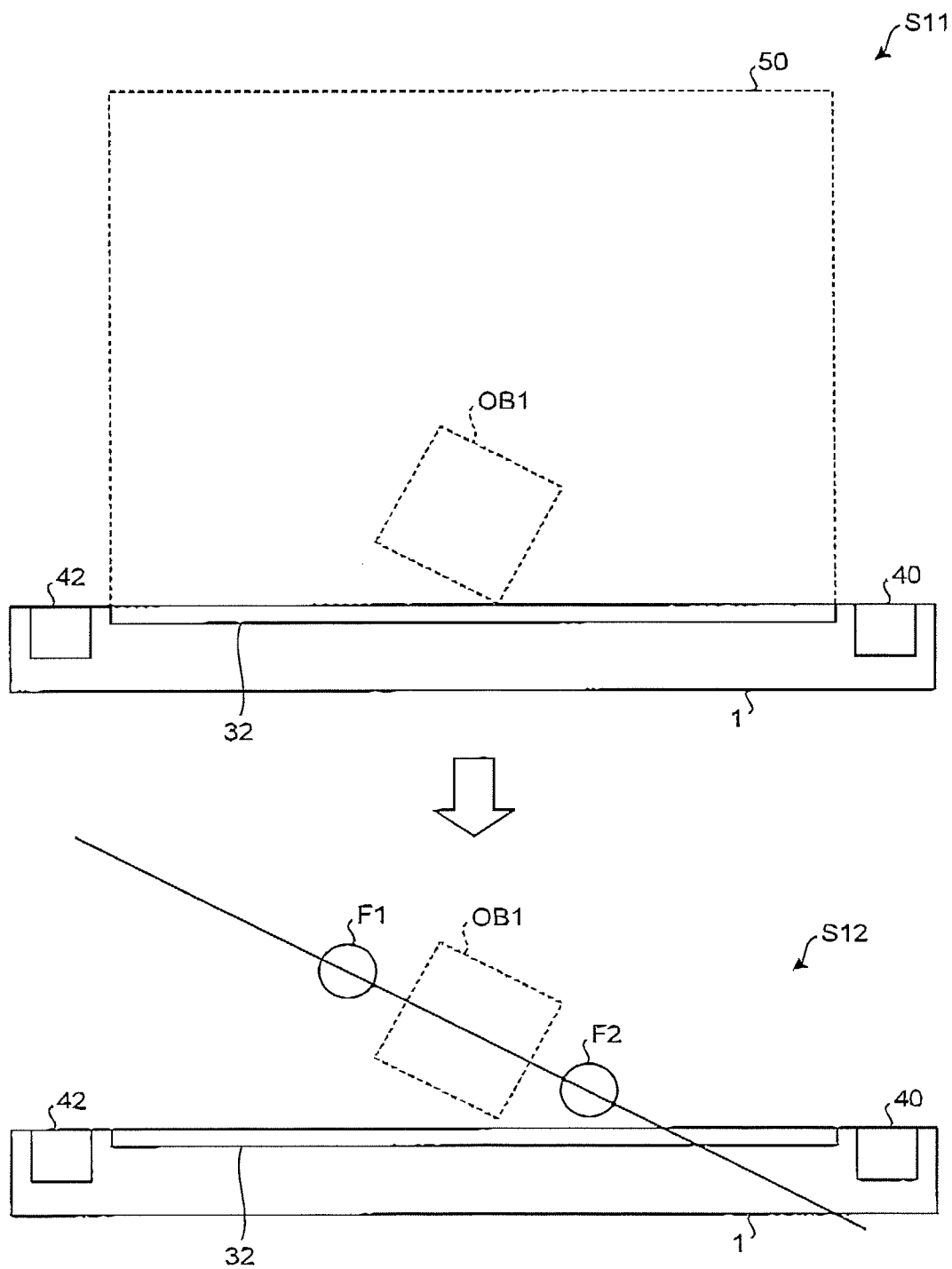
FIG. 3 is a diagram for explaining how to detect an operation performed for a three-dimensional object in the first embodiment.

Then, the detection of an operation performed for a three-dimensional object is explained with reference to FIG. 3. FIG. 3 is a diagram for explaining how to detect an operation performed for a three-dimensional object. At Step S11 illustrated in FIG. 3, the touch panel 32 stereoscopically displays a three-dimensional object OB1 in a three-dimensional space 50. The three-dimensional object OB1 is, for example, an object resembling Cube. The Cube according to the present embodiment represents an aggregation (which is so-called Rubik's Cube or so) of a plurality of cubes arranged along three directions perpendicular to one another. The aggregation has six faces, each of which is formed from an aggregation of external surfaces of cubes as elements, and the elements are provided with indications for determining whether all the elements belong to one group. The indication includes color, mark, character, number, design, and so on.

It is assumed here that the user wishes to perform some operation for the three-dimensional object OB1. To perform some operation for the three-dimensional object OB1, first, the three-dimensional object OB1 has to be selected as an operation target. To select the three-dimensional object OB1, as illustrated at Step S12, the user moves a finger F1 and a finger F2 so that the three-dimensional object OB1 is located between the finger F1 and the finger F2, and maintains this state for a longer period of time than a predetermined time.

When the two objects are detected within the three-dimensional space and the state in which the three-dimensional object OB1 is located between the two objects continues for a longer period of time than the predetermined time, the mobile phone 1 determines that the three-dimensional object OB1 has been selected, and sets the three-dimensional object OB1 to be in a selected state. The mobile phone 1 then changes a display mode of the three-dimensional object OB1, or so, to notify the user that the three-dimensional object OB1 is in the selected state.

It is determined whether the three-dimensional object OB1 is located between the two objects based on actual positions of the two objects in the three-dimensional space and a calculated position of the three-dimensional object OB1 in the three-dimensional space.

The actual positions of the two objects are calculated based on images photographed by the imaging units 40 and 42. The actual positions of the two objects may be calculated based on previously registered sizes of the respective objects, sizes of the objects in the images, and the positions of the objects in the images. The positions of the two objects may also be calculated by comparing the sizes and the positions of the objects in the image photographed by the imaging unit 40 with the sizes and the positions of the objects in the image photographed by the imaging unit 42. The detection of the object such as the finger may be implemented using a known technology. When the object is the finger, the process may be performed by setting a position of the tip of the finger as a position of the object.

A calculated position of the three-dimensional object OB1 in the three-dimensional space is calculated based on a position of the three-dimensional object OB1 on the display surface of the touch panel 32 and an amount of "floating" of the three-dimensional object OB1 in the three-dimensional space. The amount of floating of the three-dimensional object OB1 in the three-dimensional space is calculated from, for example, a difference between positions of the three-dimensional object OB1 in an image for a right eye and in an image for a left eye, which are used to stereoscopically display the three-dimensional object OB1.

The notification indicating that it is in the selected state is implemented by, for example, changing the whole color of the three-dimensional object OB1 or changing a color near a location, within the surface of the three-dimensional object OB1, intersecting a line connecting the two objects. Instead of or in addition to such visual notification, a sound or a vibration may be used to perform the notification.

In this way, when the state where the three-dimensional object OB1 is located between the actual objects such as the fingers is continuously detected for a longer period of time than a predetermined time, the mobile phone 1 determines that the three-dimensional object OB1 has been selected. An operation such that the fingers are placed so as to sandwich the three-dimensional object OB1 therebetween is similar to an operation of a person who pinches an object in order to select an actual object. Therefore, such an operation is intuitive and easy to understand as an operation for selecting the three-dimensional object OB1. In addition, by adding the continuous detection of the state for a longer period of time than the predetermined time to the condition, an unintended three-dimensional object OB1 can be prevented from being selected during the process of moving the fingers in order to select some other three-dimensional object OB1.

The objects used to operate the three-dimensional object OB1 are not limited to the fingers, and therefore may be hands, feet, sticks, setting pins, or so. When the two objects are not parallel to the display surface of the touch panel 32, that is, even when the line connecting the two objects intersects the display surface of the touch panel 32 or intersects a horizontal plane parallel to the display surface thereof, the mobile phone 1 sets the three-dimensional object OB1 to be in the selected state based on the above condition. In this way, the stereoscopic determination as to whether the three-dimensional object 021 has been selected makes it easy to perform the selection operation according to the shape of the three-dimensional object OB1.

To stereoscopically determine whether the three-dimensional object OB1 has been selected, a plurality of imaging units are desirably prepared to photograph the finger F1, the finger F2, and so on from different directions so that an obstacle will not cause a blind spot.

After it is determined that the three-dimensional object OB1 is in the selected state, the mobile phone 1 applies a change such as movement, rotation, deformation, or deletion to the three-dimensional object OB1 according to moves of the finger F1 and the finger F2.

Then, a procedure of operations of the three-dimensional object OB1 performed by the mobile phone 1 is explained with reference to FIG. 4 to FIG. 7.

Figure 4:
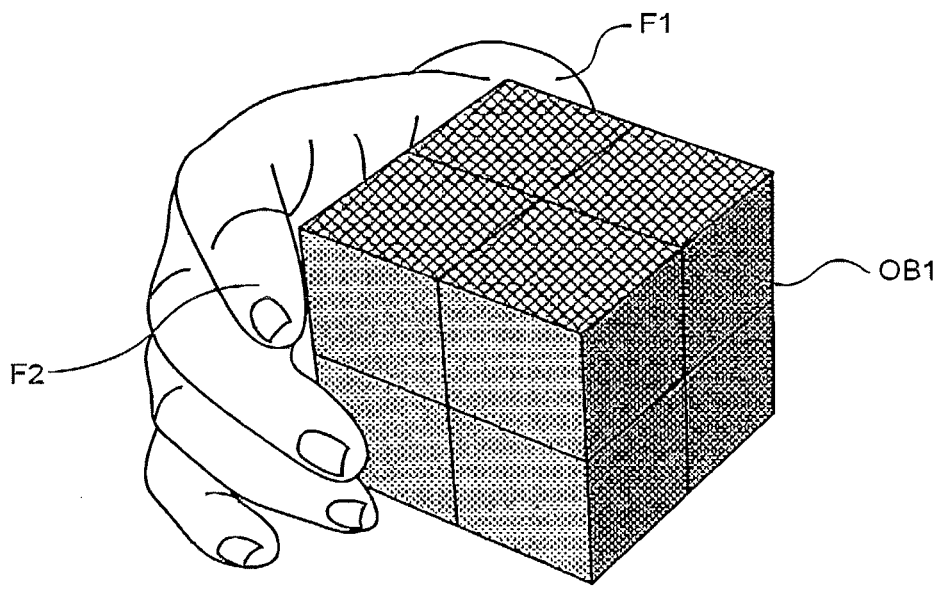
FIG. 4 is a diagram illustrating an example of how to select and operate the three-dimensional object.
Figure 5:
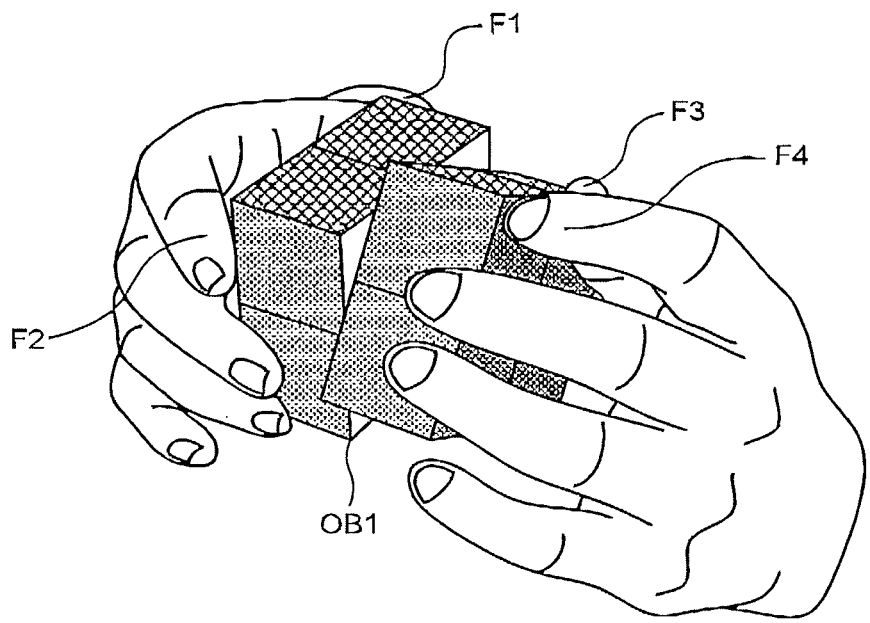
FIG. 5 is a diagram of another example of how to select and operate the three-dimensional object.

FIG. 4 is a diagram illustrating an example of how to select and operate the three-dimensional object OB1. FIG. 5 is a diagram of another example of how to select and operate the three-dimensional object OB1. In the present embodiment, a three-dimensional puzzle being an aggregation of a plurality of cubes arranged along the three directions perpendicular to one another is used as the three-dimensional object OB1. In the examples illustrated in FIG. 4 to FIG. 7, the three-dimensional object OB1 being the three-dimensional puzzle is explained as a case of using a 2×2×2 Pocket Cube, as illustrated in FIG. 4 and FIG. 5, which is a regular hexahedral three-dimensional puzzle among regular polyhedral three-dimensional puzzles. As illustrated in FIG. 4, the whole of the three-dimensional object OB1 can be rotated as it is, or a plurality of cubes that form a face can be relatively turned around an arbitrary axis as illustrated in FIG. 5. A relation between an input operation and a process to be performed for the three-dimensional object OB1 will be explained later. The three-dimensional object OB1 is not limited to the 2×2×2 Pocket Cube, and can therefore be any of various three-dimensional puzzles. For example, it can be a 3×3×3 Rubik's Cube (Registered trademark), a 4×4×4 Rubik's Revenge, and a 5×5×5 Professor's Cube.

Figure 6:
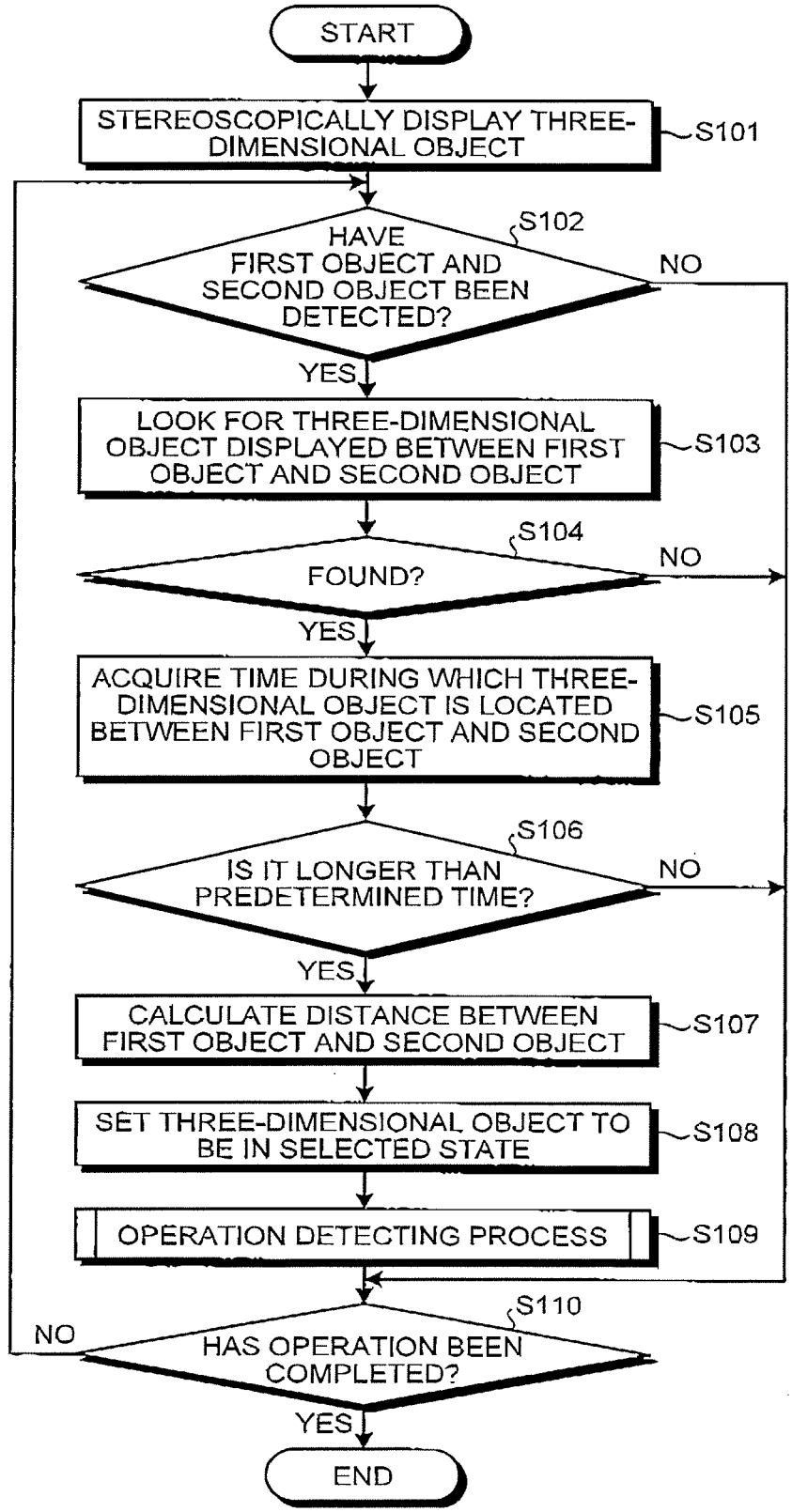
FIG. 6 is a flowchart of a procedure of a selection detecting process.

FIG. 6 is a flowchart of a procedure of a selection detecting process of the three-dimensional object OB1. The procedure illustrated in FIG. 6 is implemented by the control unit 22 executing the control program 24a triggered by detection of a predetermined operation or the like.

As illustrated in FIG. 6, first, at Step S101, the control unit 22 stereoscopically displays a three-dimensional object OB1. Specifically, as illustrated in FIG. 4 and FIG. 5, the control unit 22 causes the display unit 32a to stereoscopically display an aggregation (three-dimensional object) of the cubes arranged along the three directions perpendicular to one another in the three-dimensional space. That is, the control unit 22 controls the display unit 32a to stereoscopically display a three-dimensional puzzle (three-dimensional object) in the three-dimensional space. The data used to display the three-dimensional object OB1 may be previously stored in the storage unit 24 or may be acquired from any other device such as a server through communication by the communication unit 26.

Subsequently, at Step S102, the control unit 22 determines whether detectors, that is, the imaging units 40 and 42 have detected a first object and a second object. The first object and the second object are, for example, user's fingers.

That is, the control unit 22 controls the detectors to detect the move of objects (including the first object and the second object) in the three-dimensional space. Specifically, in the present embodiment, as illustrated in FIG. 4, the control unit 22 controls the detectors to detect that objects (including the first object and the second object) are located in positions where the objects grasp the three-dimensional object OB1 (which is grasped by one hand). Further, as illustrated in FIG. 5, the control unit 22 controls the detectors to detect groups of objects (for example, a group of fingers F1 and F2 and a group of fingers F3 and F4) grasping the three-dimensional object OB1 (which is grasped by both hands) at locations thereon. The control unit 22 may control the detectors to detect any object other than the groups of objects (e.g., user's free finger and other user's hand) as well as the groups of objects grasping the three-dimensional object OB1 (which is grasped by both hands) at locations thereon.

When the first object and the second object have not been detected (No at Step S102), then at Step S110, the control unit 22 determines whether operation completion has been detected.

For example, the operation completion may be detected when a predetermined operation is performed for the operating unit 13, or may be detected when a predetermined operation is performed for the touch panel 32. The operation completion may also be detected when a predetermined user's hand gesture is photographed by at least one of the imaging units 40 and 42. When the operation completion has been detected (Yes at Step S110), the control unit 22 ends the selection detecting process. When the operation completion has not been detected (No at Step S110), the control unit 22 re-executes Step S102 and the subsequent steps.

When the first object and the second object have been detected (Yes at Step S102), then at Step S103, the control unit 22 looks for a three-dimensional object OB1 displayed between the first object and the second object, from among displayed three-dimensional objects OB1. When there is no corresponding three-dimensional object OB1 (No at Step S104), then at Step S110, the control unit 22 determines whether the operation completion has been detected. When the operation completion has been detected (Yes at Step S110), the control unit 22 ends the selection detecting process. When the operation completion has not been detected (No at Step S110), the control unit 22 re-executes Step S102 and the subsequent steps.

When the three-dimensional object OB1 displayed between the first object and the second object is found (Yes at Step S104), then at Step S105, the control unit 22 acquires a time during which the three-dimensional object OB1 is located between the first object and the second object. When the acquired time is not longer than a predetermined time (No at Step S106), then at Step S110, the control unit 22 determines whether the operation completion has been detected. When the operation completion has been detected (Yes at Step S110), the control unit 22 ends the selection detecting process. When the operation completion has not been detected (No at Step S110), the control unit 22 re-executes Step S102 and the subsequent steps.

When the acquired time is longer than the predetermined time (Yes at Step S106), then at Step S107, the control unit 22 calculates a distance between the first object and the second object. At Step S108, the control unit 22 sets the three-dimensional object OB1 displayed between the first object and the second object to be in the selected state. At Step S109, the control unit 22 executes an operation detecting process explained later, and changes, during the execution, the three-dimensional object OB1 in the selected state according to the detected operation. After the end of the operation detecting process, the control unit 22 determines at Step S110 whether the operation completion has been detected. When the operation completion has been detected (Yes at Step S110), the control unit 22 ends the selection detecting process. When the operation completion has not been detected (No at Step S110), the control unit 22 re-executes Step S102 and the subsequent steps.

Figure 7:
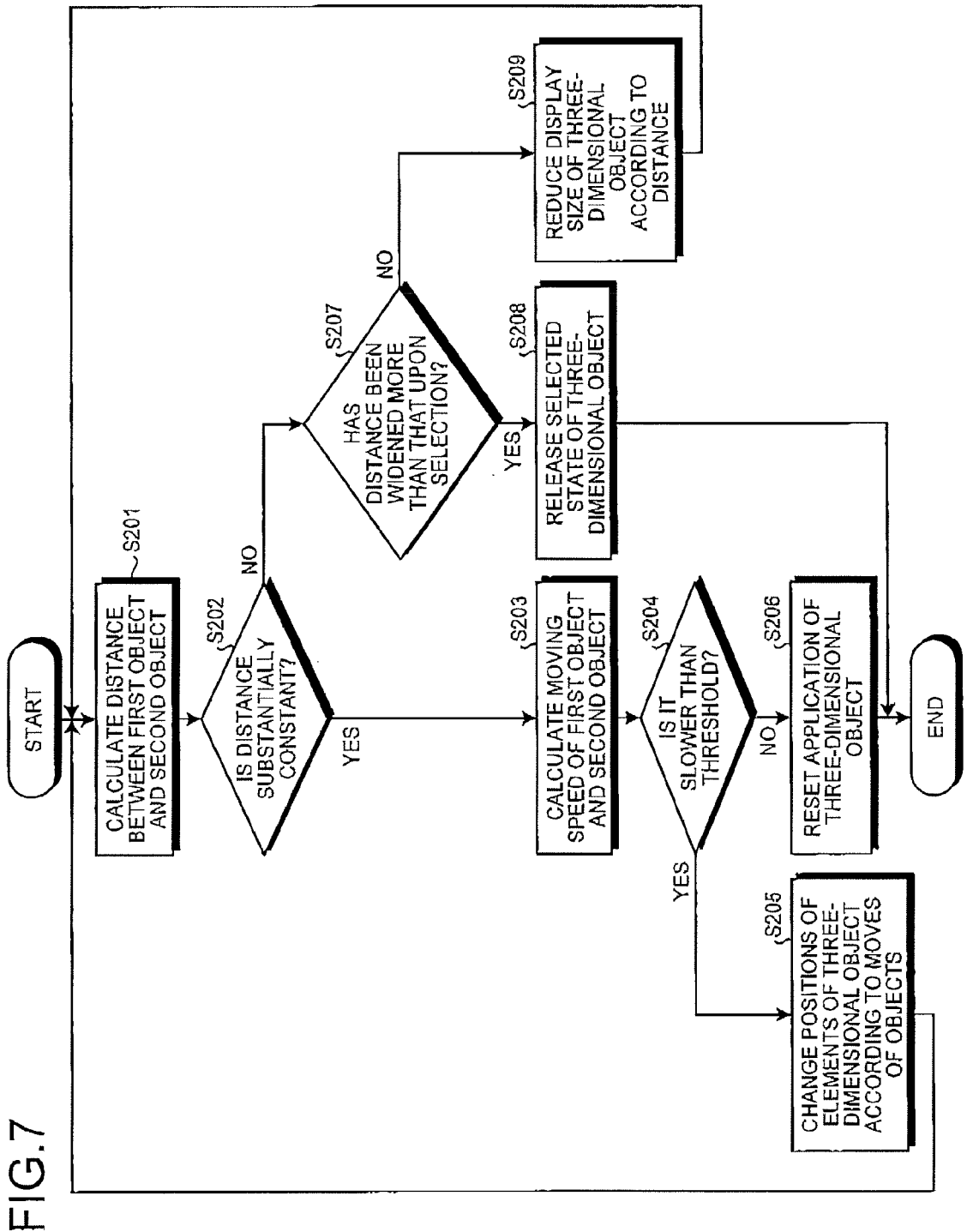
FIG. 7 is a flowchart of a procedure of an operation detecting process.

FIG. 7 is a flowchart of a procedure of the operation detecting process. The procedure illustrated in FIG. 7 is implemented by the control unit 22 executing the control program 24a.

As illustrated in FIG. 7, first, at Step S201, the control unit 22 calculates a distance between the first object and the second object. Then at Step S202, the control unit 22 determines whether the distance between the first object and the second object after the operation detecting process is started is substantially constant. The distance being substantially constant means that, for example, a change amount of the distance between the first object and the second object at a current time point falls within a predetermined range (which is ±10% or so of a maximum change amount of the distance when the first object and the second object move at a normal speed), as compared with the distance at the time of starting the operation detecting process. When the distance between the first object and the second object is continuously reduced after the start of the operation detecting process (when the first object and the second object are moving in a direction of crushing the three-dimensional object OB1), it may be determined that the distance is substantially constant. Moreover, when the distance between both objects changes only within a range of the natural shaky movement of the hand or the like, it may be determined that the distance is substantially constant.

When the distance between the first object and the second object is substantially constant (Yes at Step S202), then at Step S203, the control unit 22 calculates moving speeds of the first object and the second object. Subsequently, at Step S204, the control unit 22 determines whether each of the calculated moving speeds is slower than a threshold. The threshold used here is, for example, a moving speed of fingertips when one throws something. The moving speed compared with the threshold may be an average of the moving speed of the first object and the moving speed of the second object, or may be a higher one of them, or may be a lower one of them.

When the moving speed is lower than the threshold (Yes at Step S204), then at Step S205, the control unit 22 moves or rotates the three-dimensional object OB1 according to the detected moves of the first object and the second object. Specifically, in the present embodiment, the control unit 22 changes, at Step S205, the positions of the elements of the aggregation (three-dimensional object) as illustrated in FIG. 4 and FIG. 5 according to detection results of the detectors (that is, the moves of the objects). That is, the control unit 22 changes positions of pieces of the three-dimensional puzzle (three-dimensional object) as illustrated in FIG. 4 and FIG. 5 according to the detection results of the detectors. For example, when it is detected that the first object and the second object move rightward, the control unit 22 moves the three-dimensional object OB1 rightward according to the moves of the first object and the second object. When it is detected that the first object and the second object rotate leftward, the control unit 22 rotates the three-dimensional object leftward according to the rotation of the first object and the second object. When the movement and the rotation are simultaneously detected, the movement and the rotation are simultaneously executed. If there is an obstacle against the movement and the rotation of the three-dimensional object OB1, the movement and the rotation of the three-dimensional object OB1 may be stopped when the three-dimensional object OB1 comes in contact with the obstacle. The control unit 22 then re-executes Step S201 and the subsequent steps.

When the moving speed is higher than the threshold (No at Step S204), then at Step S206, the control unit 22 resets the application (game) of the three-dimensional object OB1. In short, in the present embodiment, because the three-dimensional object OB1 is a three-dimensional puzzle, the control unit 22 deletes the three-dimensional object OB1 during the progress of the game of the three-dimensional puzzle, to reset the game to the time of start. Specifically, when the three-dimensional object OB1 is to be deleted, the control unit 22 may display animation as if the three-dimensional object OB1 flies toward a moving direction of the first object and the second object. The control unit 22 then ends the operation detecting process. In this manner, when the first object and the second object move at a high speed as if the three-dimensional object is thrown, the three-dimensional object OB1 is deleted; thus, deletion of the three-dimensional object OB1 (that is, reset of the application of the three-dimensional object OB1) can be implemented with an intuitive operation.

When the distance between the first object and the second object is not substantially constant (No at Step S202), then at Step S207, the control unit 22 determines whether the distance has been widened more than that upon the selection of the three-dimensional object OB1, that is, upon the start of the operation detecting process. When the distance has been widened (Yes at Step S207), then at Step S208, the control unit 22 releases the selected state of the three-dimensional object OB1. The control unit 22 then ends the operation detecting process. In this way the operation of widening the distance between the first object and the second object is similar to an operation of releasing an actual object being pinched. Therefore, such an operation is intuitive and easy to understand as an operation for releasing the selection of the three-dimensional object OB1.

In the present embodiment, it is set as a basic rule that the three-dimensional object OB1 is controlled without consideration of gravity so as to be floating over the top surface of the touch panel 32 of the mobile phone 1. However, the three-dimensional object OB1 may be controlled with consideration of gravity so as to drop unless the user grasps the three-dimensional object OB1. Specifically, after the process at Step S208, the control unit 22 may move the three-dimensional object OB1, whose selected state has been released, with gravity or the like after the elapse of a given time, and return the three-dimensional object OB1 to an initial location (for example, the position on the touch panel 32 when the game is started). The control unit 22 may move the three-dimensional object OB1 more slowly than the case where the actual gravity acts thereon. The control unit 22 then ends the operation detecting process. The movement in this case is displayed in such a manner that the three-dimensional object OB1 falls with gravity and stops on a floor or a table. Before the move of the three-dimensional object OB1 is stopped, the three-dimensional object OB1 may be bounded according to the elasticity of the three-dimensional object OB1 and/or according to the hardness of the floor or the table. The magnitude of impact produced when the three-dimensional object OB1 strikes the floor or the table may be calculated, and if the impact is greater than a predetermined value, then the three-dimensional object OB1 may be displayed as if it is broken. In this case, similarly to the process at Step S206, the game is assumed to be reset to the start.

When the distance between the first object and the second object has been widened more than that upon the selection of the three-dimensional object OB1, the display size of the three-dimensional object OB1 may be increased without releasing the selected state of the three-dimensional object OB1. In this case, to discriminate this process from the process of releasing the selected state of the three-dimensional object OB1, the control unit 22 may increase the display size of the three-dimensional object OB1 without releasing the selected state of the three-dimensional object OB1 only when the groups of objects select the three-dimensional object OB1 in the selection detecting process and the moves of the objects that stretch the three-dimensional object OB1 are detected in the present operation detecting process (that is, when the operations of grasping and stretching the three-dimensional object OB1 with both hands are detected).

Meanwhile, when the distance between the first object and the second object has been reduced more than that upon the selection of the three-dimensional object OB1 (No at Step S207), then at Step S209, the control unit 22 reduces the display size of the three-dimensional object OB1 according to the distance. Thus, the user can reduce the display size of the three-dimensional object OB1 stereoscopically displayed in the three-dimensional space to any size that suits user's taste. The control unit 22 then re-executes Step S201 and the subsequent steps. The degree of reducing the display size of the three-dimensional object OB1 may be changed according to, for example, the elasticity set as an attribute in the three-dimensional object OB1. For an object whose hardness is set to be low as an attribute like a three-dimensional object OB1 resembling a rubber cube or so, the control unit 22 may increase the degree of the reduction according to how the distance between the first object and the second object is reduced. For an object whose hardness is set to be high as an attribute like a three-dimensional object OB1 resembling a plastic cube or so, the control unit 22 may keep low the degree of the reduction even if the distance between the first object and the second object is reduced.

When the distance between the first object and the second object is considerably reduced more than that upon the selection of the three-dimensional object OB1, that is, when the distance between the first object and the second object becomes less than a predetermined value, the three-dimensional object OB1 may be displayed as if it is broken. For example, in the present embodiment, as explained at step S206, the control unit 22 may delete the three-dimensional object OB1 during the progress of the game of the three-dimensional puzzle being the three-dimensional object OB1 as if the three-dimensional object OB1 is crushed, to reset the game to the start.

Figure 8:
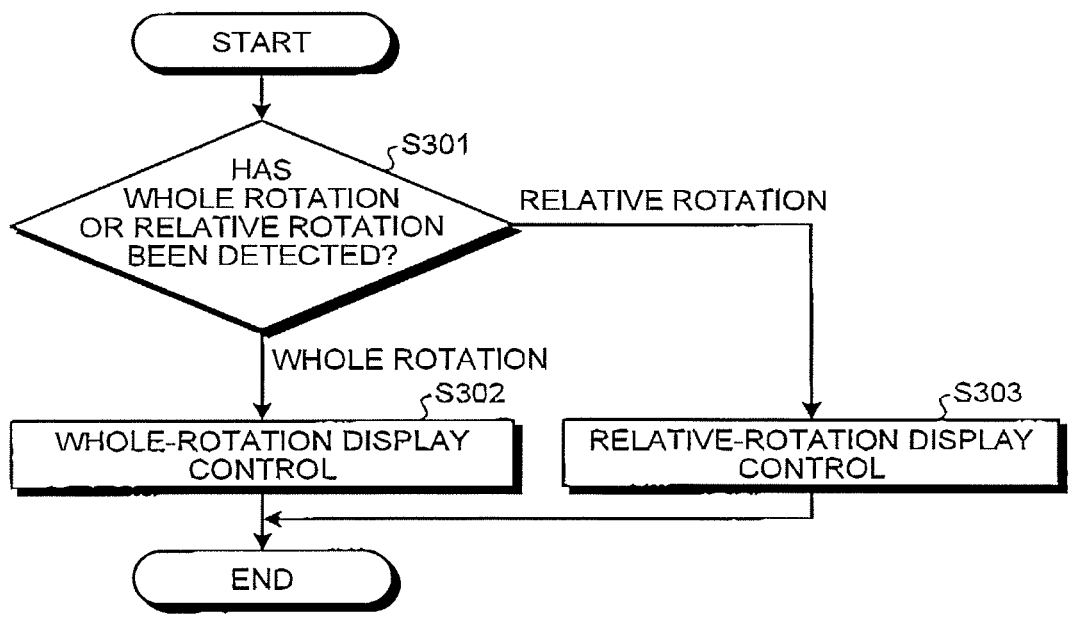
FIG. 8 is a flowchart of a detailed procedure of an operation detecting process performed for a single three-dimensional object.

Then, a detailed operation detecting process of the three-dimensional object OB1 according to the present embodiment is explained below along a flowchart of FIG. 8, with reference to FIG. 4 and FIG. 5 as appropriate. FIG. 8 is the flowchart for explaining the process at Step S205 in FIG. 7 in more detail, which is a detailed procedure of an operation detecting process performed for a single three-dimensional object OB1.

At Step S301, the control unit 22 determines whether a move of rotating the whole three-dimensional object OB1 has been detected (that is, whether a "whole rotation" has been detected) or whether a move of relatively rotating parts of the three-dimensional object OB1 has been detected (that is, whether a "relative rotation" has been detected) based on the detection results (that is, the move of the objects) of the detectors.

Specifically, at Step S301, as illustrated in FIG. 4, when it is detected through the control of the detectors that objects (including the finger F1 and the finger F2 in FIG. 4) are located in positions where the objects grasp the three-dimensional object OB1 (which is grasped by one hand in FIG. 4) and that the object has moved so as to rotate the whole three-dimensional object OB1 (Step S301: whole rotation), then the control unit 22 determines that the three-dimensional object OB1 is in the state of the whole rotation, and proceeds to Step S302. Also at Step S301, as illustrated in FIG. 5, when it is detected through the control of the detectors that groups of objects grasp the three-dimensional object OB1 (which is grasped by both hands in FIG. 5) at locations thereon and that the groups of objects moves so as to relatively rotate the parts thereof around an axis along a direction in which the groups of objects face each other (Step S301: relative rotation), then the control unit 22 determines that the three-dimensional object OB1 is in the state of the relative rotation, and proceeds to Step S303.

When it is determined at Step S301 that the whole rotation has been detected (that is, when the detectors detect that the objects (including the finger F1 and the finger F2 in FIG. 4) are located at the positions where the objects grasp the three-dimensional object OB1 and that the objects have moved) (Step S301: whole rotation), then at Step S302, the control unit 22 performs control so as to move the three-dimensional object OB1 according to the move of the objects (whole-rotation display control). That is, the control unit 22 controls the display so as to rotate the whole three-dimensional object OB1 as if it is looked over, according to the detection results of the detectors. Thereafter, the control unit 22 ends the process and re-executes Step S201 and the subsequent steps in FIG. 7.

Meanwhile, when it is determined at Step S301 that the relative rotation has been detected (that is, when the detectors detect the groups of objects grasping the three-dimensional object OB1 (which is grasped by both hands in FIG. 5) at locations thereon and further detect the moves of the groups of objects relatively rotating the parts of the three-dimensional object OB1 around an axis along the direction in which the groups of objects face each other) (Step S301: relative rotation), then at Step S303, the control unit 22 rotates blocks around the axis according to the detection results of the detectors so that each indication (such as color, mark, character, number, and design) of the blocks on one face in the three-dimensional object OB1 (for example, an aggregation of cubes with indications respectively provided thereon) may be aligned. This operation is the most basic rule in the application to operate a 3D-displayed aggregation of an arbitrary number of cubes.

Specifically, at Step S303, as illustrated in FIG. 5, the control unit 22 controls the aggregation so as to rotate cubes around rotation axis along one direction, based on the detection results of the detectors (relative-rotation display control); in a face, of the six faces, perpendicular to the one direction among the three directions perpendicular to one another, a positional relationship between the elements forming the face perpendicular thereto is not changed and, in the other faces perpendicular to the other directions among the three directions perpendicular to one another, the elements forming the other faces change places with each other between the other faces. More specifically, as illustrated in FIG. 5, the detectors detect groups of objects (one group of objects including the finger F1 and the finger F2 and another group of objects including a finger F3 and a finger F4 in FIG. 5) grasping the three-dimensional object OB1 at locations thereon, and further detect the moves of the groups of objects relatively rotating around an axis along the direction in which the groups of objects face each other. In this case, the control unit 22 determines the direction in which the groups of objects face each other as the one direction, and provides control so as to rotate the cubes according to the rotation amount of the relatively rotational move. Thus, the control unit 22 changes a position of each element of the aggregation (three-dimensional object)

as illustrated in FIG. 4 and FIG. 5. That is, the control unit 22 changes a position of each piece of the three-dimensional puzzle (three-dimensional object) as illustrated in FIG. 4 and FIG. 5 according to the detection results of the detectors. Thereafter, the control unit 22 ends the process and re-executes Step S201 and the subsequent steps in FIG. 7.

The embodiment has been explained as the process of executing the operation for grasping the three-dimensional object because a correspondence between an operation of being input to the three-dimensional puzzle displayed as the three-dimensional object and a process to be executed can be explained as a more practical one. However, it may be configured to detect any operation other than the grasping operation and execute a process according to the input operation. For example, it may be configured to detect a position of one object and rotate the three-dimensional object according to the movement of the position, or to detect positions of two objects, specify an axis around which the cubes forming the three-dimensional object are rotated based on the positions of the two objects and the change of the relative positions, and relatively rotate cubes and cubes that form the three-dimensional object based on the specified axis.

It may be configured to detect both of the grasping operation and any other operation and execute a process according to the input operation. For example, in the case of a 3×3×3 three-dimensional puzzle, as illustrated in FIG. 5, in addition to a process where the three-dimensional object OB1 is held by one hand and is rotated by the other hand, a process may be executed where when an operation of pushing center blocks with a finger is input while edge blocks are held by both hands, the center blocks are moved according to the direction of pushing it with the finger (moving direction of the finger). Thereby, for example, in the case of the 3×3×3 three-dimensional puzzle, when it is desired to rotate blocks around a center portion of the axis other than both edge portions, the three-dimensional object OB1 is selected by both hands and the center blocks are pushed by third input means, so that a desired operation can be input. In this manner, by executing the process corresponding to an operation other than the grasping operation, a user's free finger or other user's hand is used to enable rotation of the blocks, similarly to the operation performed for actual physical blocks. In this case, when the detectors detect groups of objects grasping the three-dimensional object OB1 at locations thereon and further detect any object (e.g., user's free finger or other user's hand) other than the groups of objects, then the control unit 22 may determine a direction, in which one of groups of objects (e.g., a thumb and a forefinger of user's left hand) and any object (e.g., a free finger of user's right hand) other than the groups of objects face each other, as the one direction, and provide control so as to rotate the cubes according to the rotation amount of the relatively rotational move.

In the present embodiment, the control unit 22 further may perform rotation angle control when the control is provided so as to rotate the cubes according to the rotation amount of the relatively rotational move. Specifically, the control unit 22 may determine that the cubes will be returned to their original positions or the cubes have been rotated 90 degrees, depending on whether they have been rotated 45 degrees or more. As for the rotation angle control, as a basic operation rule, it may be determined, at the time of rotating virtual blocks, whether the rotation operation is executed based on the reference of 45 degrees, because a minimum rotation angle is 90 degrees in a case of actual physical blocks. Namely, when the blocks are released at an angle of less than 45 degrees, the blocks may be returned to their original positions.

In the present embodiment, the control unit 22 may assist with the operation performed for the block after a given time elapses since the start of an application (game). Because the mobile phone 1 recognizes what should be done as a next input to complete the blocks, the control unit 22 can 3D-display blocks at a different position indicating, as a hint, which axis the user should select and how much the user should turn the blocks. In this case, not only display information but also sound, text, light, or so can be used for notification. However, in order not to lose a game element, it may be selected whether any operation assistance is provided, and even if the operation assistance is to be provided, the operation assistance is displayed after it is detected that no operation is input for the blocks for a given time.

In the present embodiment, the control unit 22 may display a time limit. Thus, by providing the time limit from the beginning, the time required for its completion can be recorded. In the present embodiment, the control unit 22 may also display the number of times where cubes have been rotated. This enables to count the number of rotations of blocks and to count how many times the blocks have been rotated before its completion. In this case, the minimum number of times may be recorded, and may be shared on a network.

Figure 9:
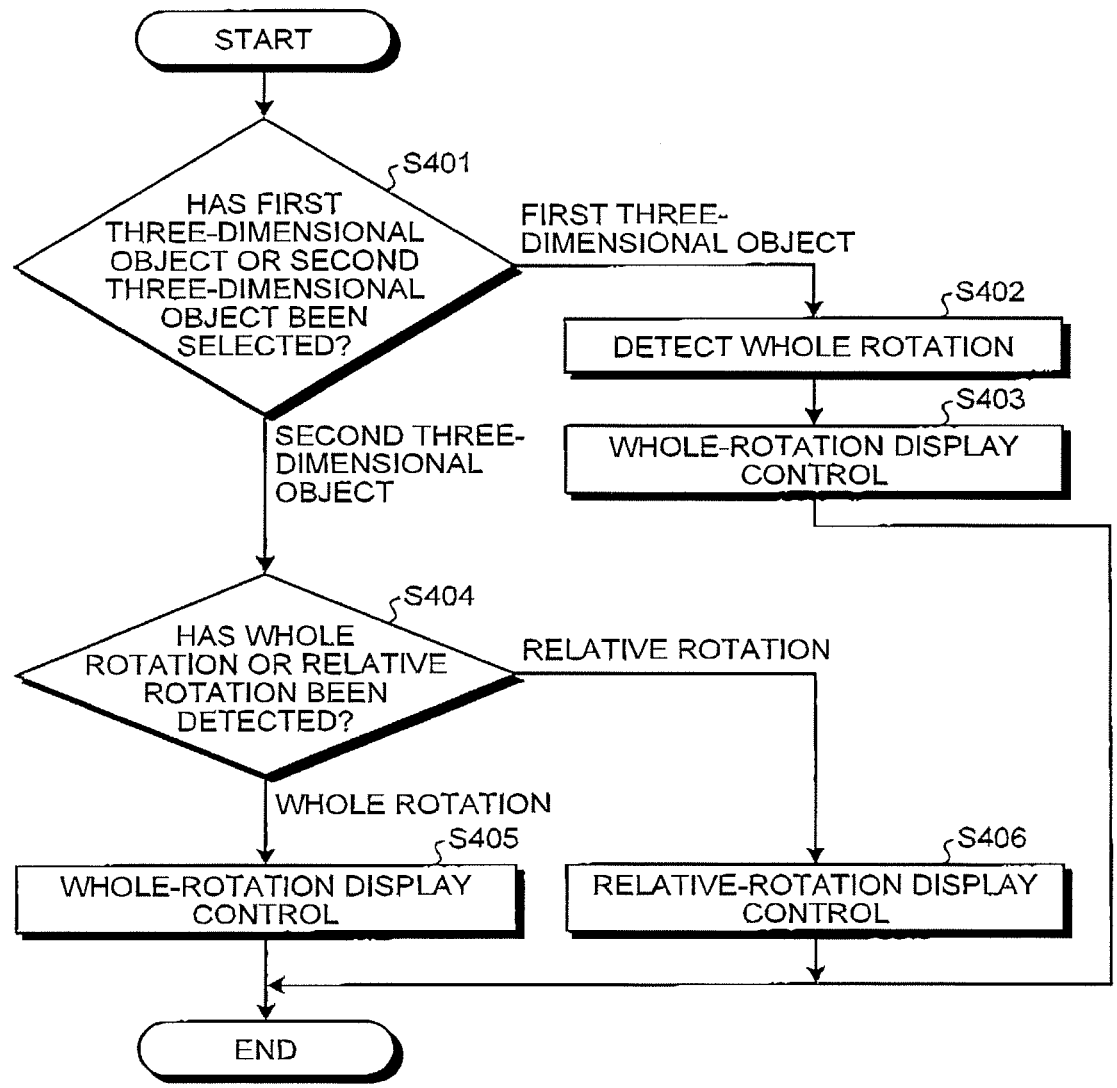
FIG. 9 is a flowchart of a detailed procedure of an operation detecting process performed for a plurality of three-dimensional objects.
Figure 10:
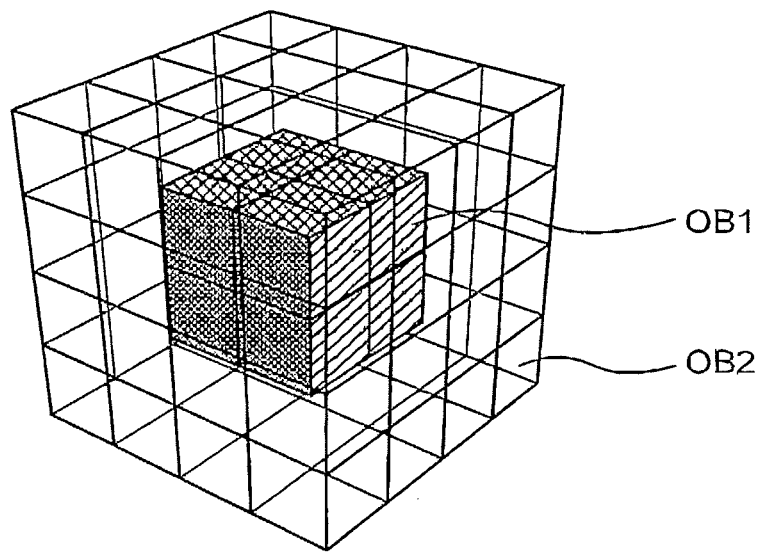
FIG. 10 is a diagram of a display example of a plurality of three-dimensional objects.
Figure 11:
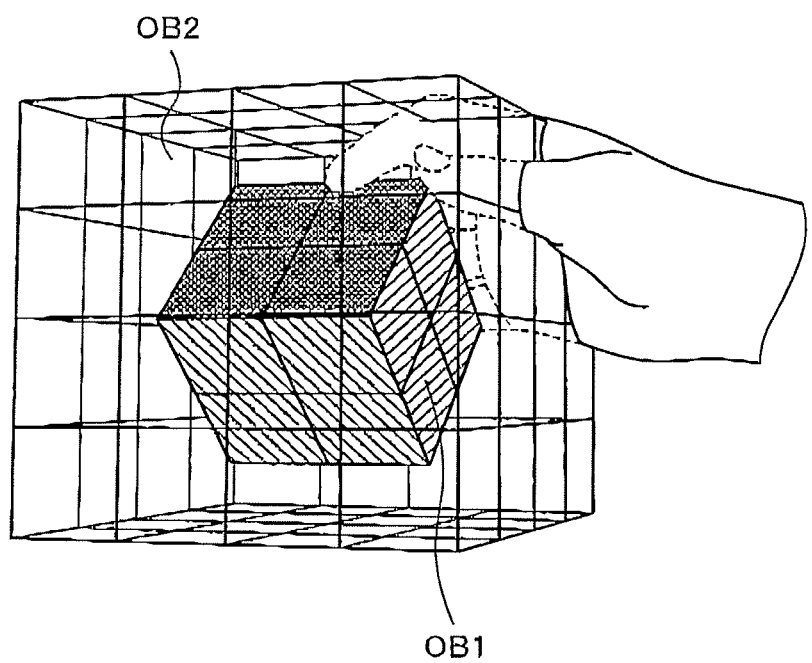
FIG. 11 is a diagram illustrating an example of how to select and operate the three-dimensional objects illustrated in FIG. 10.
Figure 12:
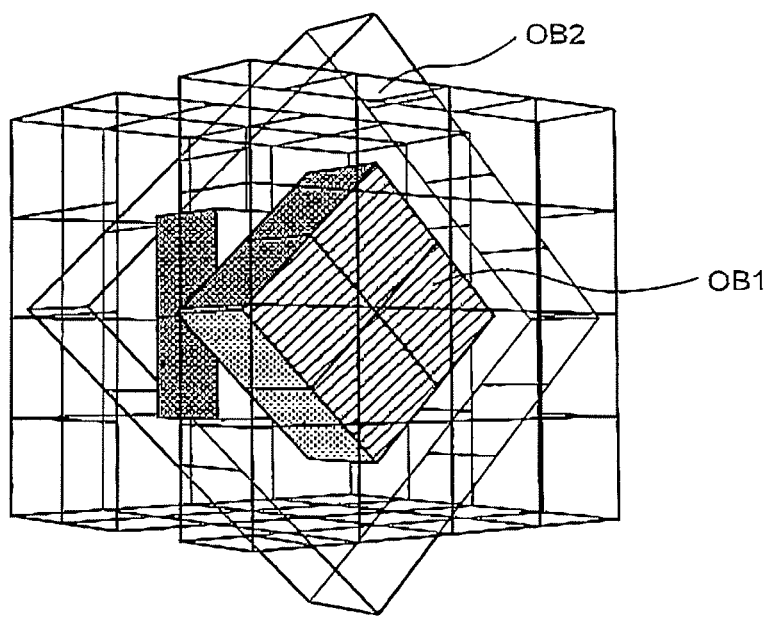
FIG. 12 is a diagram of another example of how to select and operate the three-dimensional objects illustrated in FIG. 10.

Then, a case where the three-dimensional object is a three-dimensional puzzle with a different structure is explained below with reference to FIG. 9 to FIG. 12. FIG. 9 is a flowchart of a detailed procedure of an operation detecting process performed for a plurality of three-dimensional objects. FIG. 10 is a diagram of a display example of a plurality of three-dimensional objects. FIG. 11 is a diagram illustrating an example of how to select and operate the three-dimensional objects illustrated in FIG. 10. FIG. 12 is a diagram of another example of how to select and operate the three-dimensional objects illustrated in FIG. 10. The process at Step S205 in FIG. 7 is explained in more detail with reference to FIG. 9, which is the flowchart of the detailed procedure of the operation detecting process performed for a plurality of three-dimensional objects.

The objects to be controlled and to be displayed as illustrated in FIG. 10 to FIG. 12 are stereoscopically displayed in such a manner that one three-dimensional object is nested inside another. That is, as illustrated in FIG. 10 to FIG. 12, the present embodiment is an example of controlling a plurality of blocks using 3D-display, which cannot be implemented by an actual three-dimensional puzzle (so-called Rubik's Cube and so on) or by conventional 2D-display. As illustrated in FIG. 10, as the three-dimensional objects according to the present embodiment, the three-dimensional object OB1 in the inner side is set to a 2×2×2 regular hexahedral three-dimensional puzzle (so-called Pocket Cube), and a three-dimensional object OB2 in the outer side is set to a 4×4×4 regular hexahedral three-dimensional puzzle (so-called Rubik's Revenge).

In the case of the present embodiment, also, at Step S101 in FIG. 6, the control unit 22 controls the display unit 32a to display the three-dimensional objects. Specifically, as illustrated in FIG. 10, the three-dimensional objects (the inner three-dimensional object OB1 and the outer three-dimensional object OB2) are stereoscopically displayed in the three-dimensional space. That is, as illustrated in FIG. 10, the display unit 32a stereoscopically displays them in such a manner that the three-dimensional object OB1 is nested in the three-dimensional object OB2. In this case, an application is assumed, in which blocks in the outer side and blocks in the inner side can be selected and the game is completed when a color is aligned on each face of the outer three-dimensional object and the inner three-dimensional object.

Then, a process executed by the control unit 22 for the operation detected by the detectors is explained below. As illustrated in FIG. 9, the control unit 22 determines at Step S401 whether a first three-dimensional object OB1 (the inner three-dimensional object OB1 in FIG. 10) has been selected or a second three-dimensional object OB2 (the outer three-dimensional object OB2 in FIG. 10) has been selected. Specifically, at Step S401, the control unit 22 compares coordinates of the object detected by the detectors with coordinates of the three-dimensional objects (including the first three-dimensional object OB1 and the second three-dimensional object OB2), to determine whether the first three-dimensional object OB1 has been selected or the second three-dimensional object OB2 has been selected.

When it is determined at Step S401 that the first three-dimensional object OB1 has been selected (Step S401: first three-dimensional object), then at Step S402, the control unit 22 controls the detectors, as illustrated in FIG. 11, to detect that the objects are located in positions where the objects grasp the three-dimensional object OB1 (which is grasped by one hand in FIG. 11) and that the objects have moved so as to rotate the whole three-dimensional object OB1 (that is, to detect the whole rotation).

As illustrated in FIG. 9, at Step S403, the control unit 22 provides control so as to move the three-dimensional object OB1 according to the move of the objects (whole-rotation display control). That is, the control unit 22 controls the display so as to rotate the whole three-dimensional object OB1 as if it is looked over, according to the detection results of the detectors. Thereafter, the control unit 22 ends the process and re-executes Step S201 and the subsequent steps in FIG. 7.

In this manner, when the three-dimensional objects are nested, as illustrated in FIG. 11, the display unit 32*a* stereoscopically displays them in such a manner that the three-dimensional object OB1 is nested in the three-dimensional object OB2. When the detectors detect that objects are located in positions where the objects grasp the three-dimensional object OB1 and that the objects have moved, the control unit 22 provides control so as not to move the three-dimensional object OB2 but to move only the three-dimensional object OB1 according to the move of the objects. Namely, even if the whole inner three-dimensional object OB1 is rotated, the whole outer three-dimensional object OB2 is not rotated.

Meanwhile, when it is determined at Step S401 that the second three-dimensional object OB2 has been selected (Step S401: second three-dimensional object), then at Step S404, the control unit 22 determines, based on the detection results of the detectors (that is, the move of the objects), whether the move of rotating the whole second three-dimensional object OB2 has been detected (that is, whether the whole rotation has been detected) or whether the move of relatively rotating parts of the second three-dimensional object OB2 has been detected (that is, whether the relative rotation has been detected).

Specifically, at Step S404, when it is detected through the control of the detectors that objects are located in positions where the objects grasp the three-dimensional object OB2 (which is grasped by one hand) and that the objects have moved so as to rotate the whole three-dimensional object OB2 (Step S404: whole rotation), then the control unit 22 determines that the three-dimensional object OB2 is in the state of the whole rotation, and proceeds to Step S405. Also at Step S404, as illustrated in FIG. 12, when it is detected through the control of the detectors that groups of objects grasp the second three-dimensional object OB2 (which is grasped by both hands) at locations thereon and further the groups of objects have moved so as to relatively rotate the three-dimensional object OB2 (Step S404: relative rotation) around an axis along the direction in which the groups of objects face each other, then the control unit 22 determines that the three-dimensional object OB2 is in the state of the relative rotation, and proceeds to Step S406.

When it is determined at Step S404 that the whole rotation has been detected (that is, when the detectors detect that the objects are located at the positions where the objects grasp the second three-dimensional object OB2 and that the objects have moved) (Step S404: whole rotation), then at Step S405, the control unit 22 performs control so as to move the second three-dimensional object OB2 according to the move of the objects (whole-rotation display control). That is, the control unit 22 controls the display so as to rotate the whole second three-dimensional object OB2 as if it is looked over, according to the detection results of the detectors. Thereafter, the control unit 22 ends the process and re-executes Step S201 and the subsequent steps in FIG. 7.

Meanwhile, when it is determined at Step S404 that the relative rotation has been detected (that is, as illustrated in FIG. 12, when the detectors detect groups of objects grasping the second three-dimensional object OB2 (which is grasped by both hands) at locations thereon and further detect the moves of the groups of objects relatively rotating the second three-dimensional object OB2 around axis along the direction in which the groups of objects face each other) (Step S404: relative rotation), then at Step S406, as illustrated in FIG. 12, the control unit 22 rotates blocks based on an axis according to the detection results of the detectors so that each indication (such as color, mark, character, number, and design) of blocks on one face in the second three-dimensional object OB2 (for example, an aggregation of cubes with indications respectively provided thereon) may be aligned.

Specifically, at Step S406, as illustrated in FIG. 12, the control unit 22 controls the aggregation so as to rotate cubes around rotation axis along one direction, based on the detection results of the detectors (relative-rotation display control); in a face, of the six faces, perpendicular to the one direction among the three directions perpendicular to one another, a positional relationship between the elements forming the face perpendicular thereto is not changed and, in the other faces perpendicular to the other directions among the three directions perpendicular to one another, the elements forming the other faces change places with each other between the other faces. At this time, as illustrated in FIG. 12, the detectors detect the groups of objects grasping the second three-dimensional object OB2 at locations thereon, and further detect the moves of the groups of objects relatively rotating around an axis along the direction in which the groups of objects face each other. In this case, the control unit 22 determines the direction in which the groups of objects face each other as the one direction, and provides control so as to rotate the cubes according to the rotation amount of the relatively rotational move.

More specifically, when the three-dimensional objects are nested, as illustrated in FIG. 12, the display unit 32*a* stereoscopically displays them in such a manner that the first three-dimensional object OB1 is nested in the second three-dimensional object OB2. The detectors detect the groups of objects grasping the second three-dimensional object OB2, of the three-dimensional objects OB1 and OB2, at locations thereon and further detect the moves of the groups of objects relatively rotating around an axis along the direction in which the groups of objects face each other. In this case, the control unit 22 determines the direction in which the groups of objects face each other as the one direction, and provides control so that the cubes forming the second three-dimensional object OB2 and the cubes forming the first three-dimensional object OB1, of the three-dimensional objects OB1 and 032, rotate together according to the rotation amount of the relatively rotational move with respect to the second three-dimensional object OB2. Namely, it is assumed that when a row of the outer second three-dimensional object OB2 is rotated, then the corresponding row of the inner first three-dimensional object OB1 also rotates. Thereafter, the control unit 22 ends the process and re-executes Step S201 and the subsequent steps in FIG. 7.

Figure 13:
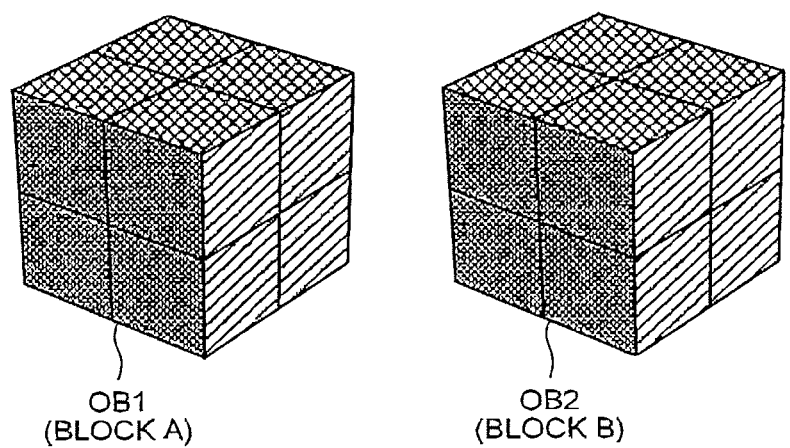
FIG. 13 is a diagram of another display example of a plurality of three-dimensional objects.
Figure 14:
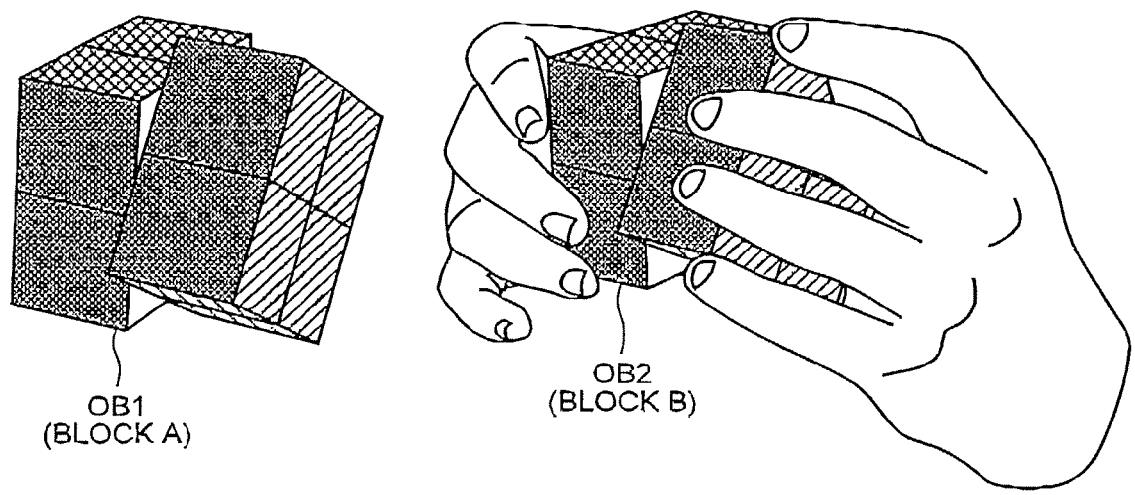
FIG. 14 is a diagram illustrating an example of how to select and operate the three-dimensional objects illustrated in FIG. 13.

Then, a case where the three-dimensional object is a three-dimensional puzzle with a different structure is explained below with reference to FIG. 13 and FIG. 14. FIG. 13 is a diagram of another display example of a plurality of three-dimensional objects. FIG. 14 is a diagram illustrating an example of how to select and operate the three-dimensional objects illustrated in FIG. 13. FIG. 13 and FIG. 14 represent cases where a plurality of three-dimensional objects are separately provided. The examples illustrated in FIG. 13 and FIG. 14 are also examples of controlling a plurality of blocks using 3D-display, which cannot be implemented by an actual three-dimensional puzzle (so-called Rubik's Cube and so on) or by conventional 2D-display. Specifically, two three-dimensional objects (three-dimensional puzzles) are rotated together based on set rules.

In the present embodiment, also, at Step S101 in FIG. 6, the control unit 22 controls the display unit 32a to display three-dimensional objects. Specifically, as illustrated in FIG. 13, the display unit 32a arranges a plurality of three-dimensional objects (the three-dimensional object OB1 and the three-dimensional object OB2) to be stereoscopically displayed in one three-dimensional space. The three-dimensional object OB1 (block A) and the three-dimensional object OB2 (block 3) as illustrated in FIG. 13 are a 2×2×2 regular hexahedral three-dimensional puzzle (so-called Pocket Cube). In this case, an application is assumed, in which the block A and the block B can be selected and the game is completed when a color is aligned on each face of the block A and the block B.

Then, a process executed by the control unit for the operation detected by the detectors is explained below. The operation detecting process according to the present embodiment is basically the same as the case where the three-dimensional objects are stereoscopically displays in such a manner that they are nested, and therefore explanation of the steps except for Step S403 and Step S406 in FIG. 9 is omitted.

At Step S402, the detectors detect that the objects are located at the positions where the objects grasp the first three-dimensional object OB1 (block A in FIG. 13) and detect that the objects have moved, then at Step S403, the control unit 22 provides control so that the first three-dimensional object OB1 and the second three-dimensional object OB2 (block B in FIG. 13) move together according to the move of the objects with respect to the first three-dimensional object OB1 (whole-rotation display control). In this case, it is configured such that the first three-dimensional object OB1 (block A) as illustrated in FIG. 13 is not allowed to rotate its specific axis partially but is allowed to rotate only the whole block.

At Step S404, as illustrated in FIG. 14, when the detectors detect the groups of objects grasping the second three-dimensional object OB2 (block B in FIG. 14), of the three-dimensional objects OB1 and OB2, at locations thereon and further detect the moves of the groups of objects relatively rotating around an axis along the direction in which the groups of objects face each other (Step S404: relative rotation), then at Step S406, the control unit 22 determines the direction in which the groups of objects face each other as the one direction, and provides control so that the cubes forming the second three-dimensional object OB2 and the cubes forming the first three-dimensional object OB1, of the three-dimensional objects OB1 and OB2, rotate together according to the rotation amount of the relatively rotational move with respect to the second three-dimensional object OB2 (relative-rotation display control). Namely, it is configured, as illustrated in FIG. 14, such that when a row of the second three-dimensional object OB2 (block B) is rotated, then the corresponding row of the first three-dimensional object OB1 (block A) also rotates.

In this way the block A and the block B mutually affect each other, and by changing the orientation of the block B, the positional relation between the block A and the block B in the previous state are again linked to each other as a new relation. Thus, according to the present embodiment, a plurality of three-dimensional objects can be simultaneously selected through the 3D application, and a different input can further be performed for the three-dimensional objects.

As explained above, the first embodiment is configured to select the three-dimensional object when the state where the three-dimensional object is located at the position between the objects such as the fingers is continued for a longer period of time than the predetermined time. Therefore, the selection of the three-dimensional object can be implemented with an intuitive and easy to understand operation.

Figure 15:
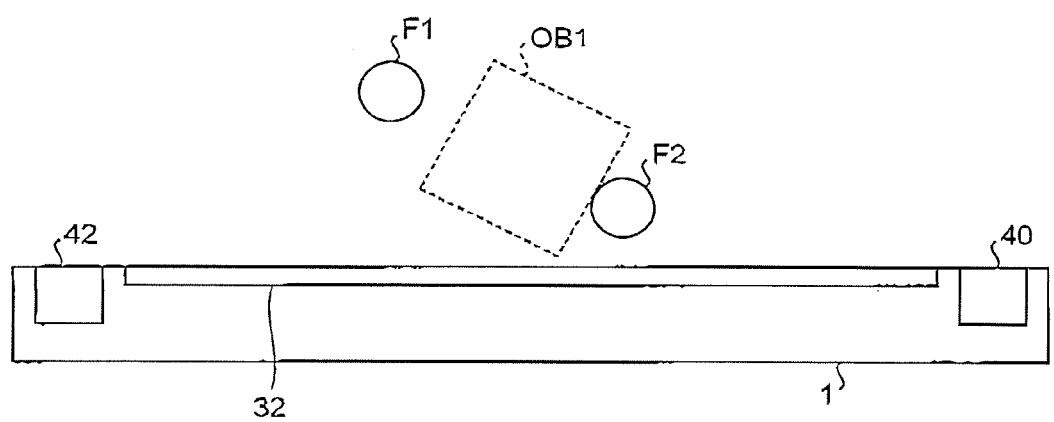
FIG. 15 is a diagram for explaining another example of how to detect an operation performed for the three-dimensional object.

As illustrated in FIG. 15, it may be set as the condition for selection that a state in which at least one of the first object and the second object is in contact with the three-dimensional object continues for a longer period of time than a predetermined time. If a plurality of three-dimensional objects are closely displayed, by setting the contact with the three-dimensional object as the condition for the selection, the user can easily select a desired three-dimensional object.

Figure 16:
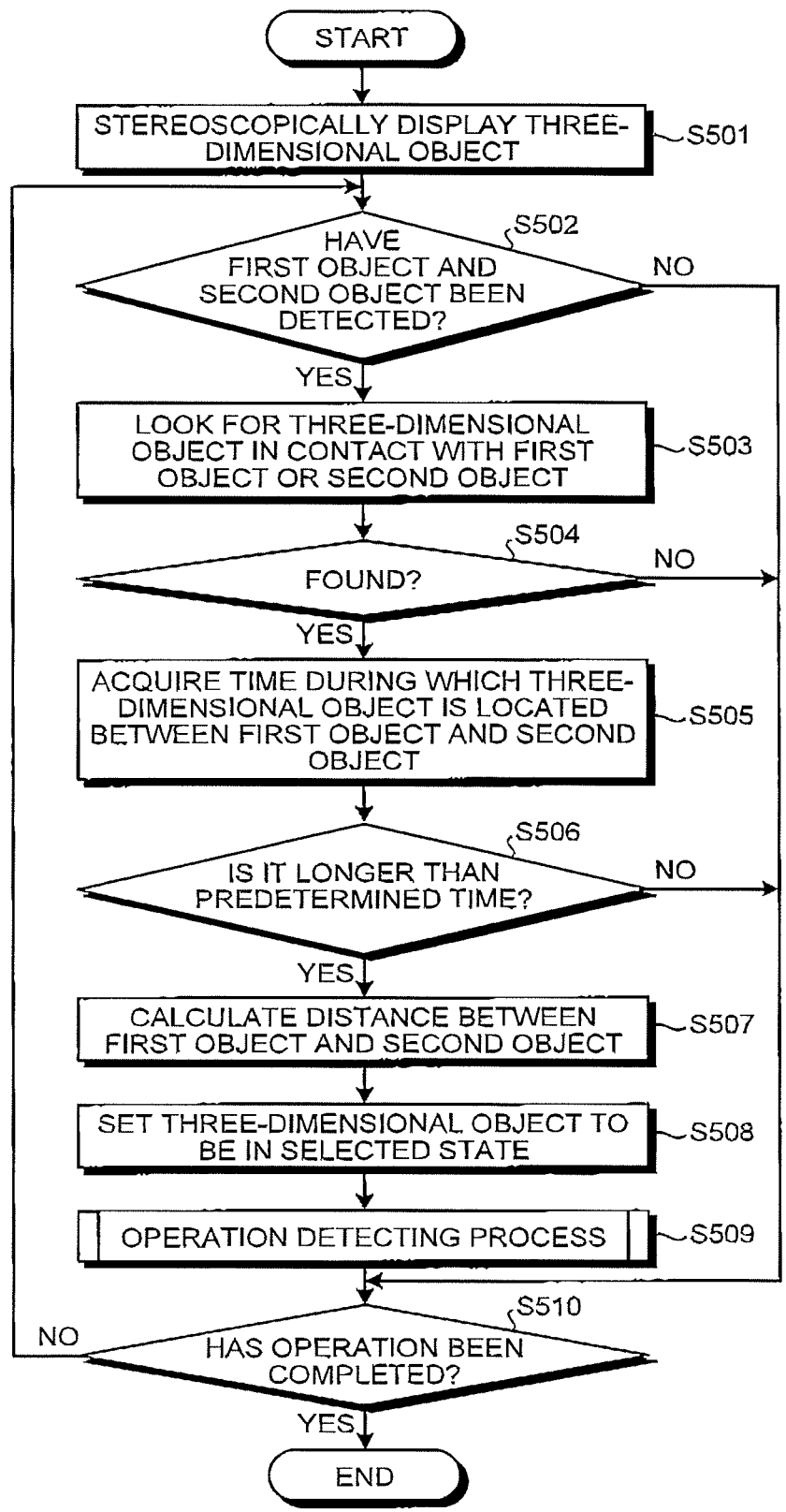
FIG. 16 is a flowchart of a procedure of the selection detecting process when a contact with the three-dimensional object is set as a condition for selection.

FIG. 16 is a flowchart of a procedure of the selection detecting process performed when the contact with the three-dimensional object is set as the condition for the selection. As illustrated in FIG. 16, first of all, at Step S501, the control unit 22 stereoscopically displays a three-dimensional object. Specifically, in the present embodiment, the control unit 22 causes the display unit 32a to stereoscopically display the aggregation (three-dimensional object) of the cubes arranged along the three directions perpendicular to one another as illustrated in FIG. 4 and FIG. 5 in the three-dimensional space. That is, the control unit 22 controls the display unit 32a to stereoscopically display a three-dimensional puzzle (three-dimensional object) in the three-dimensional space.

Subsequently, the control unit 22 determines at Step S502 whether the detectors, that is, the imaging units 40 and 42 have detected the first object and the second object. That is, the control unit 22 controls the detectors to detect the move of objects (including the first object and the second object) in the three-dimensional space. Specifically, in the present embodiment, as illustrated in FIG. 4, the control unit 22 controls the detectors to detect that objects (including the first object and the second object) are located in positions where the objects grasp the aggregation (which is grasped by one hand in FIG. 4). Further, as illustrated in FIG. 5, the control unit 22 controls the detectors to detect groups of objects grasping the aggregation (which is grasped by both hands in FIG. 5) at locations thereon. The control unit 22 may control the detectors to detect any object other than the groups of objects (e.g., user's free finger and other user's hand) as well as the groups of objects grasping the aggregation (which is grasped by both hands) at locations thereon.

When the first object and the second object have not been detected (No at Step S502), then at Step S510, the control unit 22 determines whether operation completion has been detected. When the operation completion has been detected (Yes at Step S510), the control unit 22 ends the selection detecting process. When the operation completion has not been detected (No at Step S510), the control unit 22 re-executes Step S502 and the subsequent steps.

When the first object and the second object have been detected (Yes at Step S502), then at Step S503, the control unit 22 looks for a three-dimensional object in contact with at least one of the first object and the second object, from among displayed three-dimensional objects. When there is no corresponding three-dimensional object (No at Step S504), then at Step S510, the control unit 22 determines whether the operation completion has been detected. When the operation completion has been detected (Yes at Step S510), the control unit 22 ends the selection detecting process. When the operation completion has not been detected (No at Step S510), the control unit 22 re-executes Step S502 and the subsequent steps.

When a three-dimensional object in contact with at least one of the first object and the second object is found (Yes at Step S504), then at Step S505, the control unit 22 acquires a time during which the three-dimensional object is located between the first object and the second object. When the acquired time is not longer than a predetermined time (No at Step S506), then at Step S510, the control unit 22 determines whether the operation completion has been detected. When the operation completion has been detected (Yes at Step S510), the control unit 22 ends the selection detecting process. When the operation completion has not been detected (No at Step S510), the control unit 22 re-executes Step S502 and the subsequent steps.

When the acquired time is longer than the predetermined time (Yes at Step S506), then at Step S507, the control unit 22 calculates a distance between the first object and the second object. At Step S508, the control unit 22 sets the three-dimensional object displayed between the first object and the second object to be in the selected state. At Step S509, the control unit 22 executes the operation detecting process, and changes, during the execution, the three-dimensional object in the selected state according to the detected operation. After the end of the operation detecting process, the control unit 22 determines at Step S510 whether the operation completion has been detected. When the operation completion has been detected (Yes at Step S510), the control unit 22 ends the selection detecting process. When the operation completion has not been detected (No at Step S510), the control unit 22 re-executes Step S502 and the subsequent steps.

A second embodiment will be explained below. The mobile phone 1 according to the second embodiment is different, in a procedure of the selection detecting process executed based on the functions provided by the control program 24a, from that according to the first embodiment; however, in terms of the hardware, it is configured in the same manner as that of the mobile phone 1 according to the first embodiment. Therefore, in the second embodiment, explanation that overlaps with the explanation in the first embodiment may be omitted, and the selection detecting process will be mainly explained below.

Figure 17:
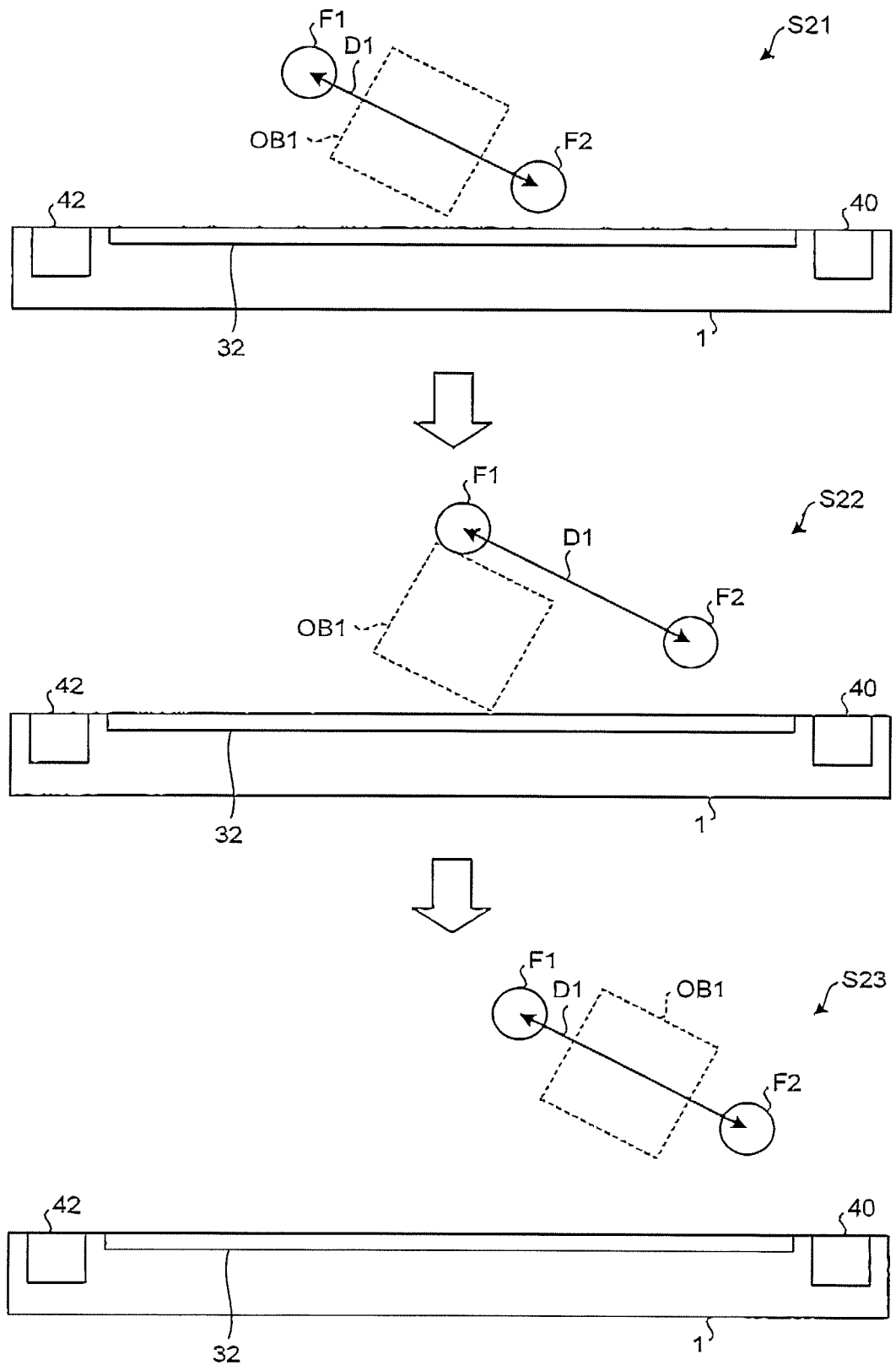
FIG. 17 is a diagram for explaining how to detect an operation performed for a three-dimensional object in a second embodiment.

First of all, the detection of an operation performed for a three-dimensional object is explained with reference to FIG. 17. FIG. 17 is a diagram for explaining how to detect an operation performed for the three-dimensional object. At Step S21 illustrated in FIG. 17, the touch panel 32 stereoscopically displays the three-dimensional object OB1 in the three-dimensional space. To select the three-dimensional object OB1, the user moves the finger F1 and the finger F2 so that the three-dimensional object OB1 is located between the finger F1 and the finger F2.

When the two objects are detected within the three-dimensional space and the three-dimensional object OB1 is located between the two objects, the mobile phone 1 monitors a change in the distance between the two objects. When the distance is substantially constant for a longer period of time than the predetermined time, the mobile phone 1 determines that the three-dimensional object OB1 has been selected, and sets the three-dimensional object OB1 to be in the selected state. The mobile phone 1 changes the display mode of the three-dimensional object OB1, or so, to notify the user that the three-dimensional object OB1 is in the selected state.

There is no need for the two objects to remain at the locations where the three-dimensional object OB1 is sandwiched therebetween while the mobile phone 1 is monitoring the change in the distance between the two objects. Namely, the user moves the finger F1 and the finger F2 so that the three-dimensional object OB1 is located between the finger F1 and the finger F2 as illustrated at Step S21, and thereafter the user may move the finger F1 and the finger F2 to some other locations without maintaining the state.

It is assumed, as illustrated at Step S22, that the user moves the finger F1 and the finger F2 from the state at Step S21 while a distance D1 between the finger F1 and the finger F2 is maintained substantially constant. In this case, as illustrated at Step S23, the mobile phone 1 sets the three-dimensional object OB1 to be in the selected state when the state in which the distance D1 between the finger F1 and the finger F2 is maintained substantially constant continues for a longer period of time than the predetermined time. The mobile phone 1 then moves the three-dimensional object OB1 into position between the finger F1 and the finger F2 as if it is already selected at the stage at Step S21. The moves of the finger F1 and the finger F2 from Step S21 to Step S23 may be stored, and the three-dimensional object OB1 may be rotated or so according to the stored moves. Thereafter, the mobile phone 1 applies a change such as movement, rotation, deformation, or deletion to the three-dimensional object OB1 according to the moves of the finger F1 and the finger F2.

In this way the two objects move once to the locations where the three-dimensional object OB1 is sandwiched therebetween, and then, the three-dimensional object is set so as to be selectable even if the objects do not remain at the locations; therefore, the user can quickly start a subsequent operation after the three-dimensional object is selected.

Figure 18:
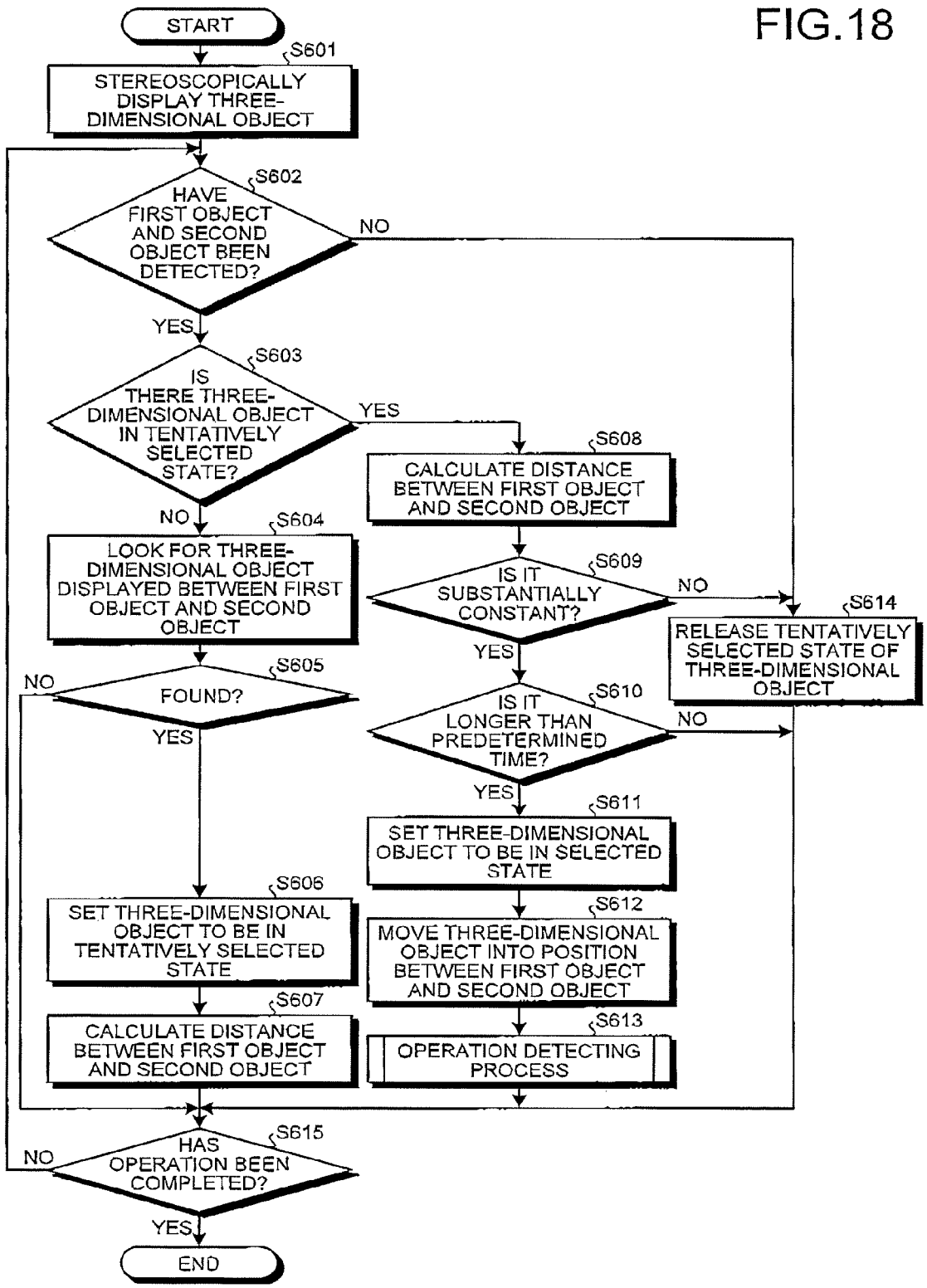
FIG. 18 is a flowchart of a procedure of a selection detecting process.

Then, a procedure executed by the mobile phone 1 for operations performed for the three-dimensional object is explained below with reference to FIG. 18. FIG. 18 is a flowchart of the procedure of the selection detecting process for the three-dimensional object. The procedure illustrated in FIG. 18 is implemented by the control unit 22 executing the control program 24a triggered by detection of a predetermined operation or the like.

As illustrated in FIG. 18, first, at Step S601, the control unit 22 stereoscopically displays a three-dimensional object. Specifically, in the present embodiment, the control unit 22 causes the display unit 32a to stereoscopically display the aggregation (three-dimensional object) of the cubes arranged along the three directions perpendicular to one another as illustrated in FIG. 4 and FIG. 5 in the three-dimensional space. That is, the control unit 22 controls the display unit 32a to stereoscopically display a three-dimensional puzzle (three-dimensional object) in the three-dimensional space.

Subsequently, at Step S602, the control unit 22 determines whether the detectors, that is, the imaging units 40 and 42 have detected the first object and the second object. That is, the control unit 22 controls the detectors to detect the move of objects (including the first object and the second object) in the three-dimensional space. Specifically, in the present embodiment, as illustrated in FIG. 4, the control unit 22 controls the detectors to detect that objects (including the first object and the second object) are located in positions where the objects grasp the aggregation (which is grasped by one hand in FIG. 4). Further, as illustrated in FIG. 5, the control unit 22 controls the detectors to detect groups of objects grasping the aggregation (which is grasped by both hands in FIG. 5) at locations thereon. The control unit 22 may control the detectors to detect any object other than the groups of objects (e.g., user's free finger and other user's hand) as well as the groups of objects grasping the aggregation (which is grasped by both hands) at locations thereon.

When the first object and the second object have not been detected (No at Step S602), then at Step S614, the control unit 22 releases, if there is a three-dimensional object in a tentatively selected state, the tentatively selected state of the three-dimensional object. The tentatively selected state represents a state where it is detected that the three-dimensional object is displayed between the two objects and thereafter it is monitored whether the distance between the two objects is maintained substantially constant.

The control unit 22 then determines at Step S615 whether the operation completion has been detected. When the operation completion has been detected (Yes at Step S615), the control unit 22 ends the selection detecting process. When the operation completion has not been detected (No at Step S615), the control unit 22 re-executes Step S602 and the subsequent steps.

When the first object and the second object have been detected (Yes at Step S602), then at Step S603, the control unit 22 determines whether there is a three-dimensional object in the tentatively selected state. When there is no three-dimensional object in the tentatively selected state (No at Step S603), then at Step S604, the control unit 22 looks for a three-dimensional object displayed between the first object and the second object, from among displayed three-dimensional objects.

When there is no corresponding three-dimensional object (No at Step S605), then at Step S615, the control unit 22 determines whether the operation completion has been detected. When the operation completion has been detected (Yes at Step S615), the control unit 22 ends the selection detecting process. When the operation completion has not been detected (No at Step S615), the control unit 22 re-executes Step S602 and the subsequent steps.

When the three-dimensional object displayed between the first object and the second object is found (Yes at Step S605), then at Step S606, the control unit 22 sets the three-dimensional object displayed between the first object and the second object to be in the tentatively selected state. The control unit 22 calculates, at Step S607, a distance between the first object and the second object.

The control unit 22 then determines at Step S615 whether the operation completion has been detected. When the operation completion has been detected (Yes at Step S615), the control unit 22 ends the selection detecting process. When the operation completion has not been detected (No at Step S615), the control unit 22 re-executes Step S602 and the subsequent steps.

When the first object and the second object have been detected and there is a three-dimensional object in the tentatively selected state (Yes at Step S603), then at Step S608, the control unit 22 calculates a distance between the first object and the second object. The control unit 22 then determines at Step S609 whether the distance is substantially constant. When the distance is not substantially constant (No at Step S609), then at Step S614, the control unit 22 releases the tentatively selected state of the three-dimensional object in the tentatively selected state.

The control unit 22 then determines at Step S615 whether the operation completion has been detected. When the operation completion has been detected (Yes at Step S615), the control unit 22 ends the selection detecting process. When the operation completion has not been detected (No at Step S615), the control unit 22 re-executes Step S602 and the subsequent steps.

When the distance between the first object and the second object is substantially constant (Yes at Step S609), then at Step S610, the control unit 22 determines whether a time during which the distance is maintained substantially constant is longer than a predetermined time. When the time during which the distance is maintained substantially constant is not longer than the predetermined time (No at Step S610), then at Step S615, the control unit 22 determines whether the operation completion has been detected. When the operation completion has been detected (Yes at Step S615), the control unit 22 ends the selection detecting process. When the operation completion has not been detected (No at Step S615), the control unit 22 re-executes Step S602 and the subsequent steps.

When the time during which the distance is maintained substantially constant is longer than the predetermined time (Yes at Step S610), then at Step S611, the control unit 22 sets the three-dimensional object in the tentatively selected state to be in the selected state. At Step S612, the control unit 22 moves the three-dimensional object OB1 into position between the first object and the second object. At Step S613, the control unit 22 executes the operation detecting process as illustrated in FIG. 7 to FIG. 9, and changes, during the execution, the three-dimensional object in the selected state according to the detected operation.

After the end of the operation detecting process, the control unit 22 determines at Step S615 whether the operation completion has been detected. When the operation completion has been detected (Yes at Step S615), the control unit 22 ends the selection detecting process. When the operation completion has not been detected (No at Step S615), the control unit 22 re-executes Step S602 and the subsequent steps.

As explained above, the second embodiment is configured to select the three-dimensional object when the three-dimensional object is located at the position between the objects such as the fingers and then the distance between the objects is maintained substantially constant for a longer period of time than the predetermined time. Therefore, the user can quickly start a subsequent operation after the three-dimensional object is selected.

Figure 19:
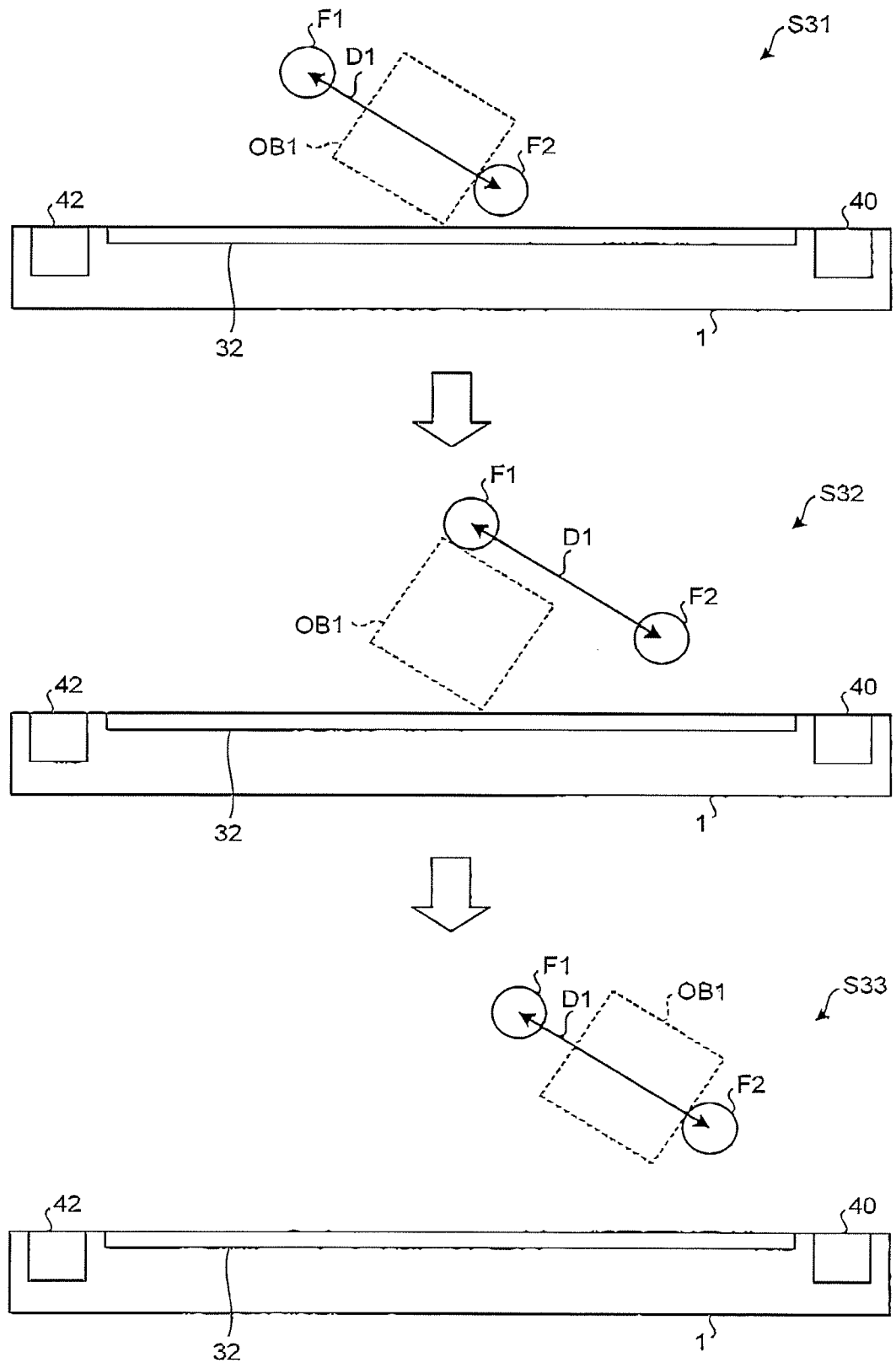
FIG. 19 is a diagram for explaining another example of how to detect an operation performed for the three-dimensional object.

As illustrated at Step S31 to Step S33 in FIG. 19, a state, in which at least one of the first object and the second object is brought into contact with the three-dimensional object and then the distance between the first object and the second object is maintained substantially constant for a longer period of time than the predetermined time, may be set as the condition for selecting the three-dimensional object. FIG. 19 is a diagram for explaining another example of how to detect an operation performed for the three-dimensional object. If a plurality of three-dimensional objects are closely displayed, by setting the contact with the three-dimensional object as the condition for the selection, the user can easily select a desired three-dimensional object.

Figure 20:
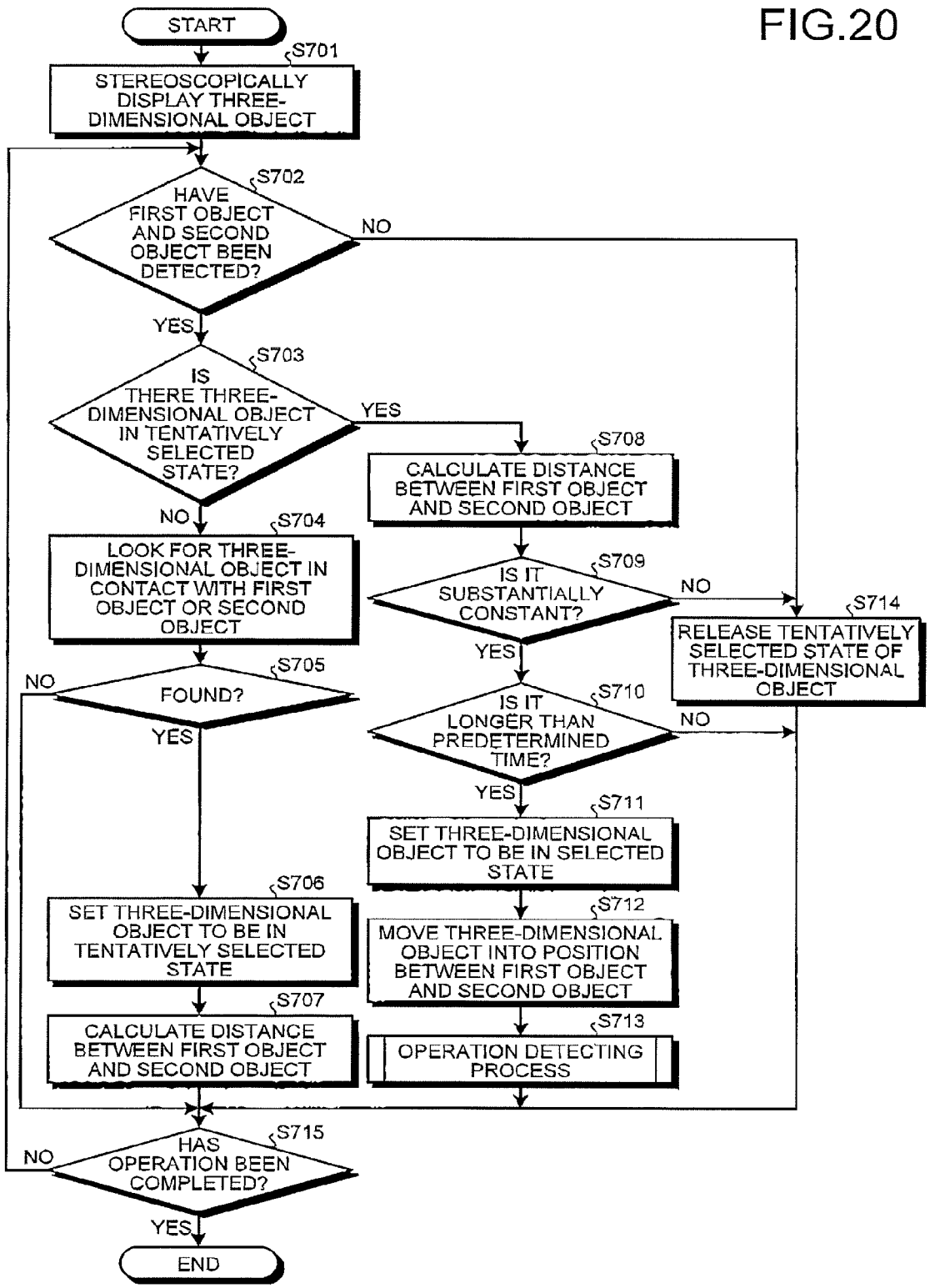
FIG. 20 is a flowchart of a procedure of the selection detecting process when a contact with the three-dimensional object is set as a condition for selection.

FIG. 20 is a flowchart of a procedure of the selection detecting process when the contact with the three-dimensional object is set as the condition for the selection. As illustrated in FIG. 20, first, at Step S701, the control unit 22 stereoscopically displays a three-dimensional object. Specifically, in the present embodiment, the control unit 22 causes the display unit 32a to stereoscopically display the aggregation (three-dimensional object) of the cubes arranged along the three directions perpendicular to one another as illustrated in FIG. 4 and FIG. 5 in the three-dimensional space. That is, the control unit 22 controls the display unit 32a to stereoscopically display a three-dimensional puzzle (three-dimensional object) in the three-dimensional space.

Subsequently, at Step S702, the control unit 22 determines whether the detectors, that is, the imaging units 40 and 42 have detected the first object and the second object. That is, the control unit 22 controls the detectors to detect the move of objects (including the first object and the second object) in the three-dimensional space. Specifically, in the present embodiment, as illustrated in FIG. 4, the control unit 22 controls the detectors to detect that objects (including the first object and the second object) are located in positions where the objects grasp the aggregation (which is grasped by one hand in FIG. 4). Further, as illustrated in FIG. 5, the control unit 22 controls the detectors to detect groups of objects grasping the aggregation (which is grasped by both hands in FIG. 5) at locations thereon. The control unit 22 may control the detectors to detect any object other than the groups of objects (e.g., user's free finger and other user's hand) as well as the groups of objects grasping the aggregation (which is grasped by both hands) at locations thereon.

When the first object and the second object have not been detected (No at Step S702), then at Step S73.4, the control unit 22 releases, if there is a three-dimensional object in the tentatively selected state, the tentatively selected state of the three-dimensional object. The tentatively selected state represents a state where it is detected that the three-dimensional object is displayed between the two objects and thereafter it is monitored whether the distance between the two objects is maintained substantially constant.

The control unit 22 then determines at Step S715 whether the operation completion has been detected. When the operation completion has been detected (Yes at Step S715), the control unit 22 ends the selection detecting process. When the operation completion has not been detected (No at Step S715), the control unit 22 re-executes Step S702 and the subsequent steps.

When the first object and the second object have been detected (Yes at Step S702), then at Step S703, the control unit 22 determines whether there is a three-dimensional object in the tentatively selected state. When there is no three-dimensional object in the tentatively selected state (No at Step S703), then at Step S704, the control unit 22 looks for a three-dimensional object in contact with at least one of the first object and the second object, from among displayed three-dimensional objects.

When there is no corresponding three-dimensional object (No at Step S705), then at Step S715, the control unit 22 determines whether the operation completion has been detected. When the operation completion has been detected (Yes at Step S715), the control unit 22 ends the selection detecting process. When the operation completion has not been detected (No at Step S715), the control unit 22 re-executes Step S702 and the subsequent steps.

When the three-dimensional object in contact with at least one of the first object and the second object is found (Yes at Step S705), then at Step S706, the control unit 22 sets the three-dimensional object displayed between the first object and the second object to be in the tentatively selected state. The control unit 22 calculates, at Step S707, a distance between the first object and the second object.

The control unit 22 then determines at Step S715 whether the operation completion has been detected. When the operation completion has been detected (Yes at Step S715), the control unit 22 ends the selection detecting process. When the operation completion has not been detected (No at Step S715), the control unit 22 re-executes Step S702 and the subsequent steps.

When the first object and the second object have been detected and there is a three-dimensional object in the tentatively selected state (Yes at Step S703), then at Step S708, the control unit 22 calculates a distance between the first object and the second object. The control unit 22 then determines at Step S709 whether the distance is substantially constant. When the distance is not substantially constant (No at Step S709), then at Step S714, the control unit 22 releases the tentatively selected state of the three-dimensional object in the tentatively selected state.

The control unit 22 then determines at Step S715 whether the operation completion has been detected. When the operation completion has been detected (Yes at Step S715), the control unit 22 ends the selection detecting process. When the operation completion has not been detected (No at Step S715), the control unit 22 re-executes Step S702 and the subsequent steps.

When the distance between the first object and the second object is substantially constant (Yes at Step S709), then at Step S710, the control unit 22 determines whether a time during which the distance is maintained substantially constant is longer than a predetermined time. When the time during which the distance is maintained substantially constant is not longer than the predetermined time (No at Step S710), then at Step S715, the control unit 22 determines whether the operation completion has been detected. When the operation completion has been detected (Yes at Step S715), the control unit 22 ends the selection detecting process. When the operation completion has not been detected (No at Step S715), the control unit 22 re-executes Step S702 and the subsequent steps.

When the time during which the distance is maintained substantially constant is longer the predetermined time (Yes at Step S710), then at Step S711, the control unit 22 sets the three-dimensional object in the tentatively selected state to be in the selected state. At Step S712, the control unit 22 moves the three-dimensional object OB1 into position between the first object and the second object. At Step S713, the control unit 22 executes the operation detecting process as illustrated in FIG. 7 to FIG. 9, and changes, during the execution, the three-dimensional object in the selected state according to the detected operation.

After the end of the operation detecting process, the control unit 22 determines at Step S715 whether the operation completion has been detected. When the operation completion has been detected (Yes at Step S715), the control unit 22 ends the selection detecting process. When the operation completion has not been detected (No at Step S715), the control unit 22 re-executes Step S702 and the subsequent steps.

A third embodiment will be explained below. The mobile phone 1 according to the third embodiment is different, in procedures of the selection detecting process and the operation detecting process executed based on the functions provided by the control program 24a, from these according to the first embodiment; however, in terms of the hardware, it is configured in the same manner as that of the mobile phone 1 according to the first embodiment. Therefore, in the third embodiment, explanation that overlaps with the explanation in the first embodiment may be omitted, and the selection detecting process and the operation detecting process will be mainly explained below.

Figure 21:
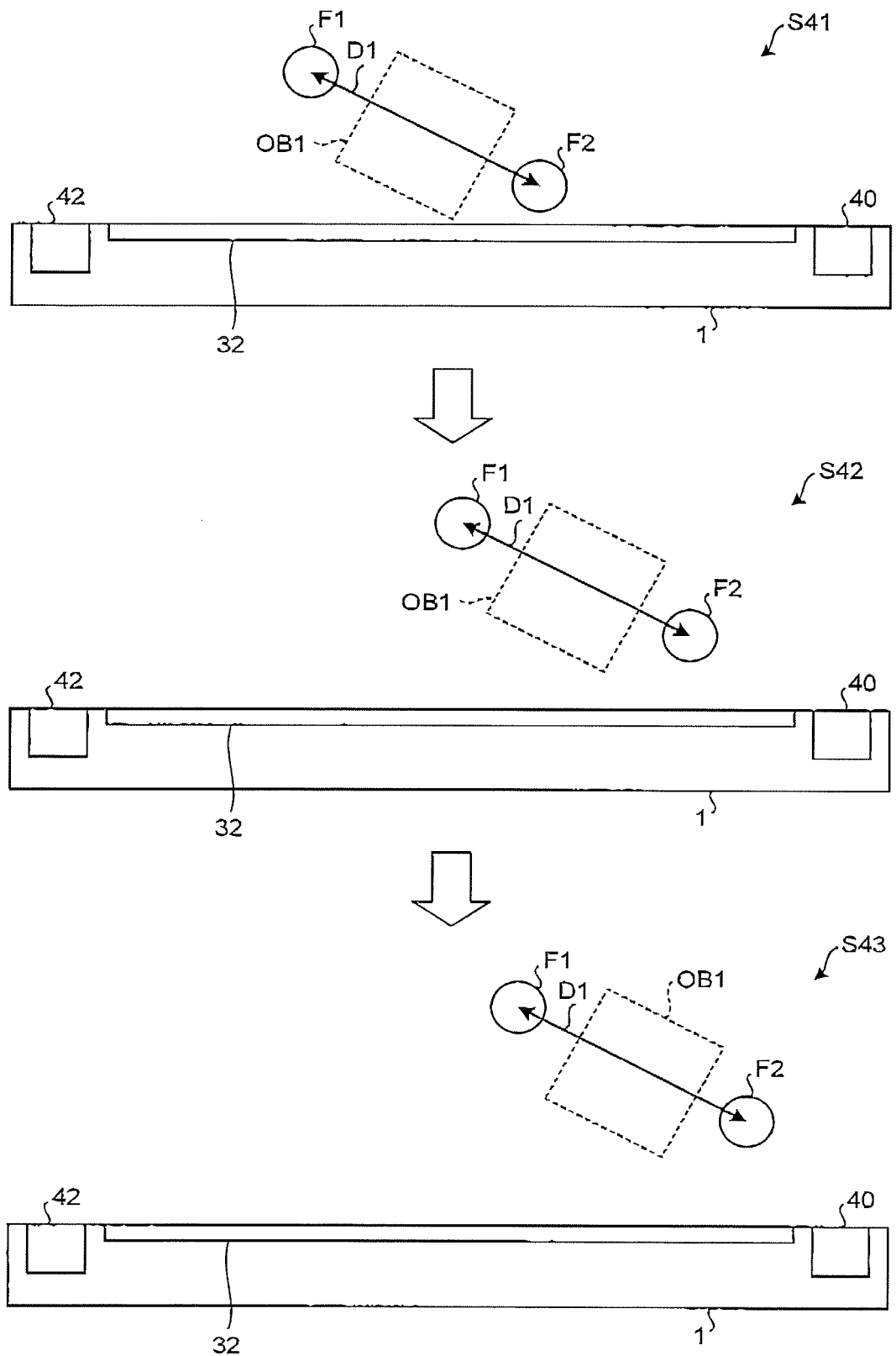
FIG. 21 is a diagram for explaining how to detect an operation performed for a three-dimensional object in a third embodiment.
Figure 22:
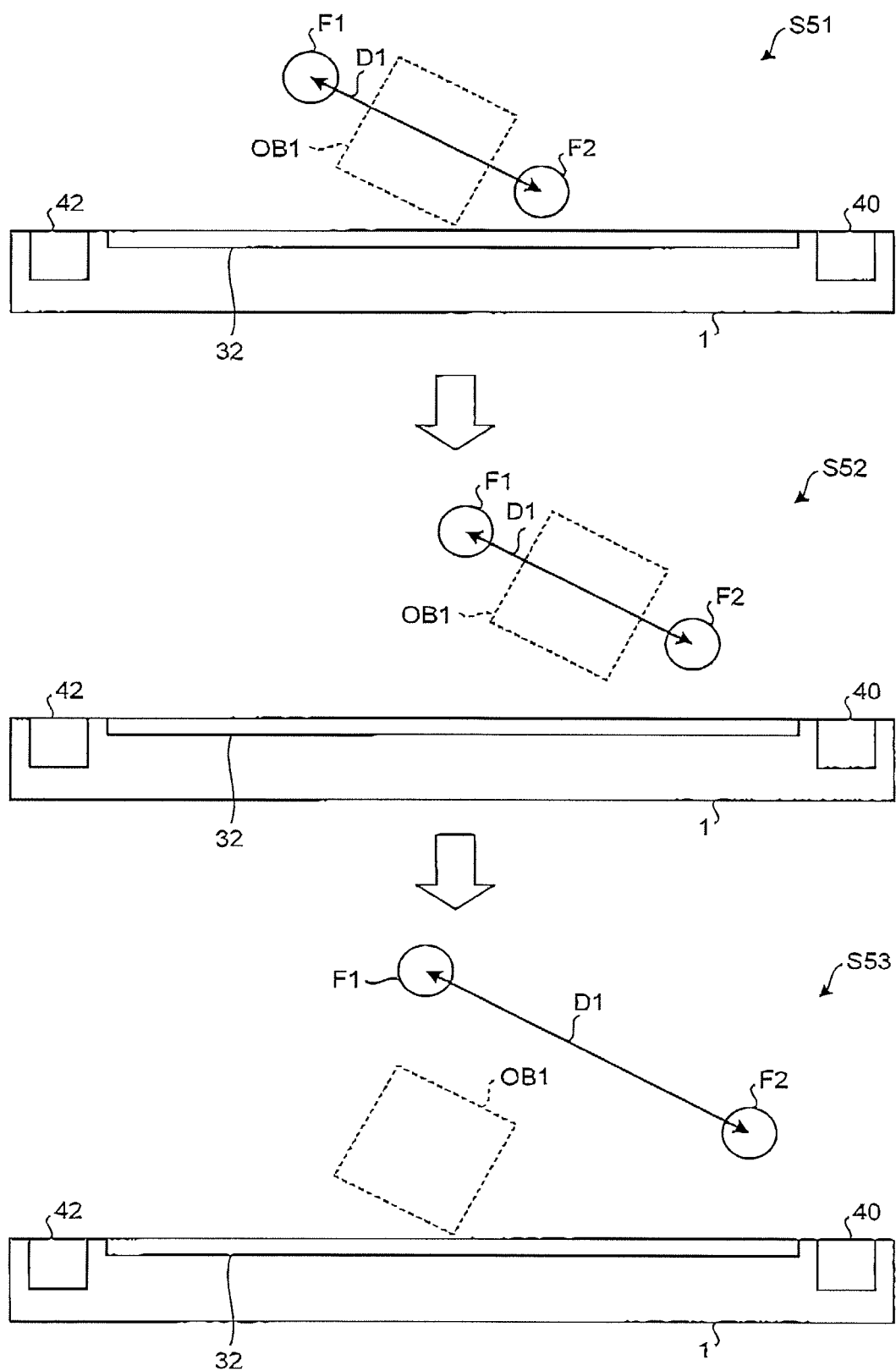
FIG. 22 is a diagram for explaining how to detect an operation performed for the three-dimensional object in the third embodiment.

First of all, the detection of an operation performed for a three-dimensional object is explained with reference to FIG. 21 and FIG. 22. FIG. 21 and FIG. 22 are diagrams for explaining how to detect an operation performed for the three-dimensional object. At Step S41 illustrated in FIG. 21, the touch panel 32 stereoscopically displays the three-dimensional object OB1 in the three-dimensional space. To select the three-dimensional object OB1, the user moves the finger F1 and the finger F2 so that the three-dimensional object OB1 is located between the finger F1 and the finger F2.

When the two objects are detected within the three-dimensional space and the three-dimensional object OB1 is located between the two objects, the mobile phone 1 monitors a change in a distance between the two objects. When the distance is substantially constant for a longer period of time than the predetermined time, the mobile phone 1 determines that the three-dimensional object OB1 has been selected, and sets the three-dimensional object OB1 to be in the selected state. The mobile phone 1 then changes the display mode of the three-dimensional object OB1, or so, to notify the user that the three-dimensional object OB1 is in the selected state.

There is no need for the two objects to remain at the locations where the three-dimensional object OB1 is sandwiched therebetween while the mobile phone 1 is monitoring the change in the distance between the two objects. Namely, the user moves the finger F1 and the finger F2 so that the three-dimensional object OB1 is located between the finger F1 and the finger F2 as illustrated at Step S41, and thereafter the user may move the finger F1 and the finger F2 to some other locations without maintaining the state.

It is assumed, as illustrated at Step S42, that the user moves the finger F1 and the finger F2 from the state at Step S41 while the distance D1 therebetween is maintained substantially constant. In this case, the mobile phone 1 applies a change such as movement, rotation, deformation, or deletion to the three-dimensional object OB1 according to the moves of the finger F1 and the finger F2 from the stage when it is detected that the three-dimensional object OB1 is displayed between the finger F1 and the finger F2, that is, from the stage at Step S41. As illustrated at Step S43, the mobile phone 1 sets the three-dimensional object OB1 to be in the selected state at the stage when the state in which the distance D1 between the finger F1 and the finger F2 is maintained substantially constant continues for a longer period of time than the predetermined time.

As illustrated at Step S51 to Step S53 in FIG. 22, when the distance D1 between the finger F1 and the finger F2 is widened, that is, when the selection is not performed before the predetermined time elapses, the mobile phone 1 applies a reverse change to the change applied thereto so far, to the three-dimensional object OB1. Consequently, the three-dimensional object OB1 is displayed at the same position as that at the stage at Step S51 in the same state. The speed of the reverse change applied to the three-dimensional object OB1 may be higher than the speed of the change applied to the three-dimensional object OB1 so far. That is, the three-dimensional object OB1 may be reversely changed as if it is reversely reproduced at a high speed.

In this way, by starting to apply the change to the three-dimensional object from when it is detected that the three-dimensional object is displayed between the two objects, the user can recognize that the three-dimensional object is being selected before the selection is determined. As a result, the user is able to know, at an early point, whether an intended three-dimensional object has been selected. Until the state in which the distance between the two objects is maintained substantially constant continues for a longer period of time than the predetermined time, the three-dimensional object with the change applied thereto may be displayed in a mode (e.g., translucent mode) different from the normal mode or from the mode in the selected state, so that the user can easily determine the state of the three-dimensional object.

Figure 23:
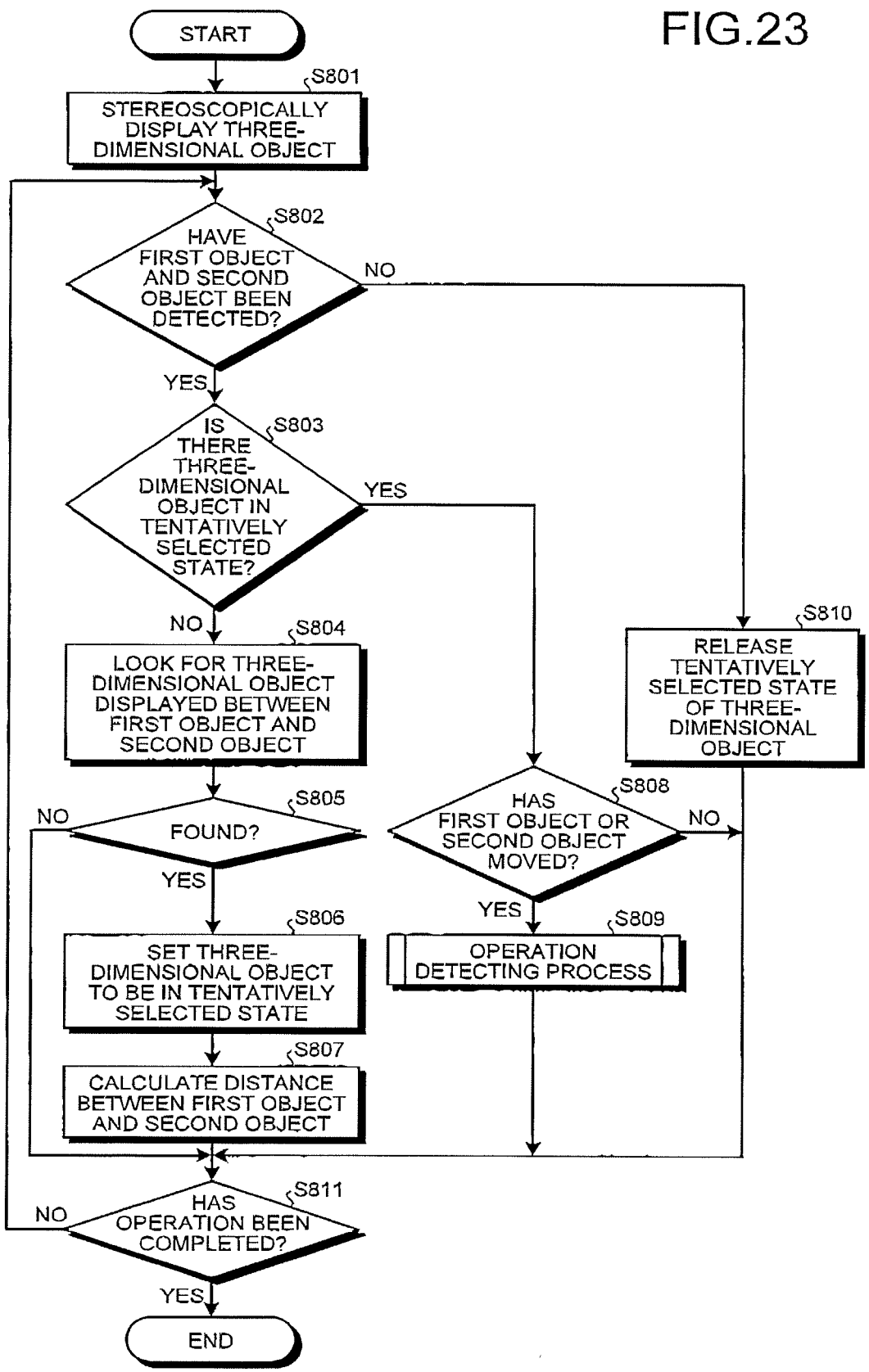
FIG. 23 is a flowchart of a procedure of a selection detecting process.

Then, a procedure executed by the mobile phone 1 for operations performed for the three-dimensional object is explained below with reference to FIG. 23 and FIG. 24. FIG. 23 is a flowchart of the procedure of the selection detecting process for the three-dimensional object. The procedure illustrated in FIG. 23 is implemented by the control unit 22 executing the control program 24a triggered by detection of a predetermined operation or the like.

As illustrated in FIG. 23, first, at Step S801, the control unit 22 stereoscopically displays a three-dimensional object. Specifically, in the present embodiment, the control unit 22 causes the display unit 32a to stereoscopically display the aggregation (three-dimensional object) of the cubes arranged along the three directions perpendicular to one another as illustrated in FIG. 4 and FIG. 5 in the three-dimensional space. That is, the control unit 22 controls the display unit 32a to stereoscopically display a three-dimensional puzzle (three-dimensional object) in the three-dimensional space.

Subsequently, at Step S802, the control unit 22 determines whether the detectors, that is, the imaging units 40 and 42 have detected the first object and the second object. That is, the control unit 22 controls the detectors to detect the move of objects (including the first object and the second object) in the three-dimensional space. Specifically, in the present embodiment, as illustrated in FIG. 4, the control unit 22 controls the detectors to detect that objects (including the first object and the second object) are located in the positions where the objects grasp the aggregation (which is grasped by one hand in FIG. 4). Further, as illustrated in FIG. 5, the control unit 22 controls the detectors to detect groups of objects grasping the aggregation (which is grasped by both hands in FIG. 5) at locations thereon. The control unit 22 may control the detectors to detect any object other than the groups of objects (e.g., user's free finger and other user's hand) as well as the groups of objects grasping the aggregation (which is grasped by both hands) at locations thereon.

When the first object and the second object have not been detected (No at Step S802), then at Step S810, the control unit 22 releases, if there is a three-dimensional object in the tentatively selected state, the tentatively selected state of the three-dimensional object.

The control unit 22 then determines at Step S811 whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

When the first object and the second object have been detected (Yes at Step S802), then at Step S803, the control unit 22 determines whether there is a three-dimensional object in the tentatively selected state. When there is no three-dimensional object in the tentatively selected state (No at Step S803), then at Step S804, the control unit 22 looks for a three-dimensional object displayed between the first object and the second object, from among displayed three-dimensional objects.

When there is no corresponding three-dimensional object (No at Step S805), then at Step S811, the control unit 22 determines whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

When the three-dimensional object displayed between the first object and the second object is found (Yes at Step S805), then at Step S806, the control unit 22 sets the three-dimensional object displayed between the first object and the second object to be in the tentatively selected state. The control unit 22 calculates, at Step S807, a distance between the first object and the second object.

The control unit 22 then determines at Step S811 whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

When the first object and the second object have been detected and there is a three-dimensional object in the tentatively selected state (Yes at Step S803), then at Step S808, the control unit 22 determines whether at least one of the first object and the second object has moved. When both the first object and the second object have not moved (No at Step S808), then at Step S811, the control unit 22 determines whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

When at least one of the first object and the second object has moved. (Yes at Step S808), then at Step S809, the control unit 22 executes the operation detecting process illustrated in FIG. 24, and changes, during the execution, the three-dimensional object in the selected state according to the detected operation.

After the end of the operation detecting process, the control unit 22 determines at Step S811 whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

Figure 24:
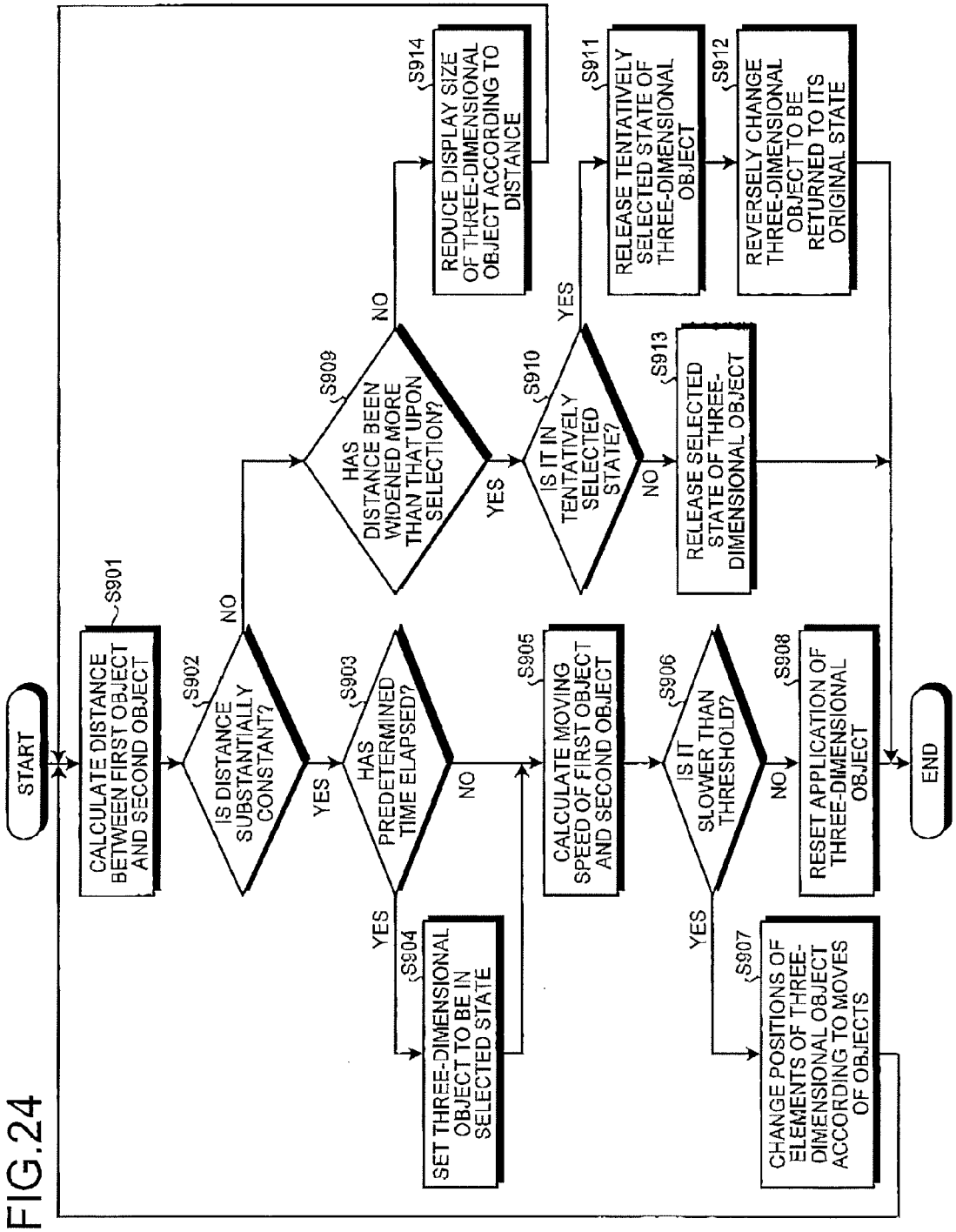
FIG. 24 is a flowchart of a procedure of an operation detecting process.

FIG. 24 is a flowchart of a procedure of the operation detecting process. The procedure illustrated in FIG. 24 is implemented by the control unit 22 executing the control program 24a. As illustrated in FIG. 24, first, at Step S901, the control unit 22 calculates a distance between the first object and the second object. Then at Step S902, the control unit 22 determines whether the distance between the first object and the second object after the start of the operation detecting process is substantially constant.

When the distance between the first object and the second object is substantially constant (Yes at Step S902), then at Step S903, the control unit 22 determines whether a predetermined time has elapsed since the start of the operation detecting process. When the predetermined time has elapsed (Yes at Step S903), then at Step S904, the control unit 22 sets, if there is a three-dimensional object in the tentatively selected state, the three-dimensional object to be in the selected state. When the predetermined time has not elapsed (No at Step S903), the control unit 22 does not execute Step S904.

Subsequently, at Step S905, the control unit 22 calculates moving speeds of the first object and the second object. The control unit 22 then determines at Step S906 whether each of the calculated moving speeds is slower than a threshold. When the moving speed is slower than the threshold (Yes at Step S906), then at Step S907, the control unit 22 moves or rotates the three-dimensional object according to the detected moves of the first object and second object. Specifically, in the present embodiment, the control unit 22 changes, at Step S907, positions of the elements of the aggregation (three-dimensional object) as illustrated in FIG. 4, FIG. 5, and FIG. 10 to FIG. 14, according to the detection results (i.e. moves of the objects) of the detectors. That is, the control unit 22 changes the positions of pieces of the three-dimensional puzzle (three-dimensional object) as illustrated in FIG. 4, FIG. 5, and FIG. 10 to FIG. 14, according to the detection results of the detectors. The control unit 22 then re-executes Step S901 and the subsequent steps.

When the moving speed is higher than the threshold (No at Step S906), then at Step S908, the control unit 22 resets the application (game) of the three-dimensional object. Namely, in the present embodiment, because the three-dimensional object is the three-dimensional puzzle, the control unit 22 deletes the three-dimensional object during the progress of the game of the three-dimensional puzzle, to reset the game to the start. Specifically, when the three-dimensional object is to be deleted, the control unit 22 may display animation as if the three-dimensional object flies toward a moving direction of the first object and the second object. The control unit 22 then ends the operation detecting process.

When the distance between the first object and the second object is not substantially constant (No at Step S902), then at Step S909, the control unit 22 determines whether the distance has been widened more than that upon the selection of the three-dimensional object, that is, upon the start of the operation detecting process. When the distance has been widened (Yes at Step S909), then at Step S910, the control unit 22 determines whether the three-dimensional object displayed between the first object and the second object is in the tentatively selected state.

When the three-dimensional object is in the tentatively selected state (Yes at Step S910), then at Step S911, the control unit 22 releases the tentatively selected state of the three-dimensional object. At Step S912, the control unit 22 reversely changes the three-dimensional object to be returned to its original state. The control unit 22 then ends the operation detecting process.

When the three-dimensional object is not in the tentatively selected state, that is, is in the selected state (No at Step S910), then at Step S913, the control unit 22 releases the selected state of the three-dimensional object. The control unit 22 then ends the operation detecting process.

In the present embodiment, it is set as a basic rule that the three-dimensional object is controlled without consideration of gravity so as to be floating over the top surface of the touch panel 32 of the mobile phone 1. However, the three-dimensional object may be controlled with consideration of gravity so as to drop unless the user grasps the three-dimensional object. Specifically, after the process at Step S913, the control unit 22 may move the three-dimensional object, whose selected state has been released, with gravity or the like after the elapse of a given time, and return the three-dimensional object to an initial location (for example, the position on the touch panel 32 when the game is started). The control unit 22 may move the three-dimensional object more slowly than the case where the actual gravity acts thereon. The control unit 22 then ends the operation detecting process. The movement in this case is displayed in such a manner that the three-dimensional object falls with gravity and stops on a floor or a table. Before the move of the three-dimensional object is stopped, the three-dimensional object may be bounded according to the elasticity of the three-dimensional object or according to the hardness of the floor or the table. The magnitude of impact produced when the three-dimensional object strikes the floor or the table may be calculated, and if the impact is greater than a predetermined value, then the three-dimensional object may be displayed as if it is broken. In this case, similarly to the process at Step S908, the game is assumed to be reset to the start.

When the distance between the first object and the second object has been widened more than that upon the selection of the three-dimensional object, the display size of the three-dimensional object may be increased without releasing the selected state of the three-dimensional object. In this case, to discriminate this process from the process of releasing the selected state of the three-dimensional object, the control unit 22 may increase the display size of the three-dimensional object without releasing the selected state of the three-dimensional object only when the groups of objects select the three-dimensional object in the selection detecting process and the moves of the objects that stretch the three-dimensional object are detected in the operation detecting process (that is, when the operations of grasping and stretching the three-dimensional object with the both hands are detected).

Meanwhile, when the distance between the first object and the second object has been reduced more than that upon the selection of the three-dimensional object (No at Step S909), then at Step S914, the control unit 22 reduces the display size of the three-dimensional object according to the distance. Thus, the user can reduce the display size of the three-dimensional object stereoscopically displayed in the three-dimensional space to any size that suits user's taste. The control unit 22 then re-executes Step S901 and the subsequent steps. The degree of reducing the display size of the three-dimensional object may be changed according to, for example, the hardness set as an attribute in the three-dimensional object. When the distance between the first object and the second object is considerably reduced more than that upon the selection of the three-dimensional object, that is, when the distance between the first object and the second object becomes a predetermined value or less, the three-dimensional object may be displayed as if it is broken. For example, in the present embodiment, as explained at step S908, the control unit 22 may delete the three-dimensional object during the progress of the game of the three-dimensional puzzle being the three-dimensional object as if the three-dimensional object is crushed, to reset the game to the start.

As explained above, the third embodiment is configured to change the three-dimensional object according to the operation from the time when it is detected that the three-dimensional object is located between the objects such as the fingers, and therefore the user can easily recognize the selection of the three-dimensional object.

Figure 25:
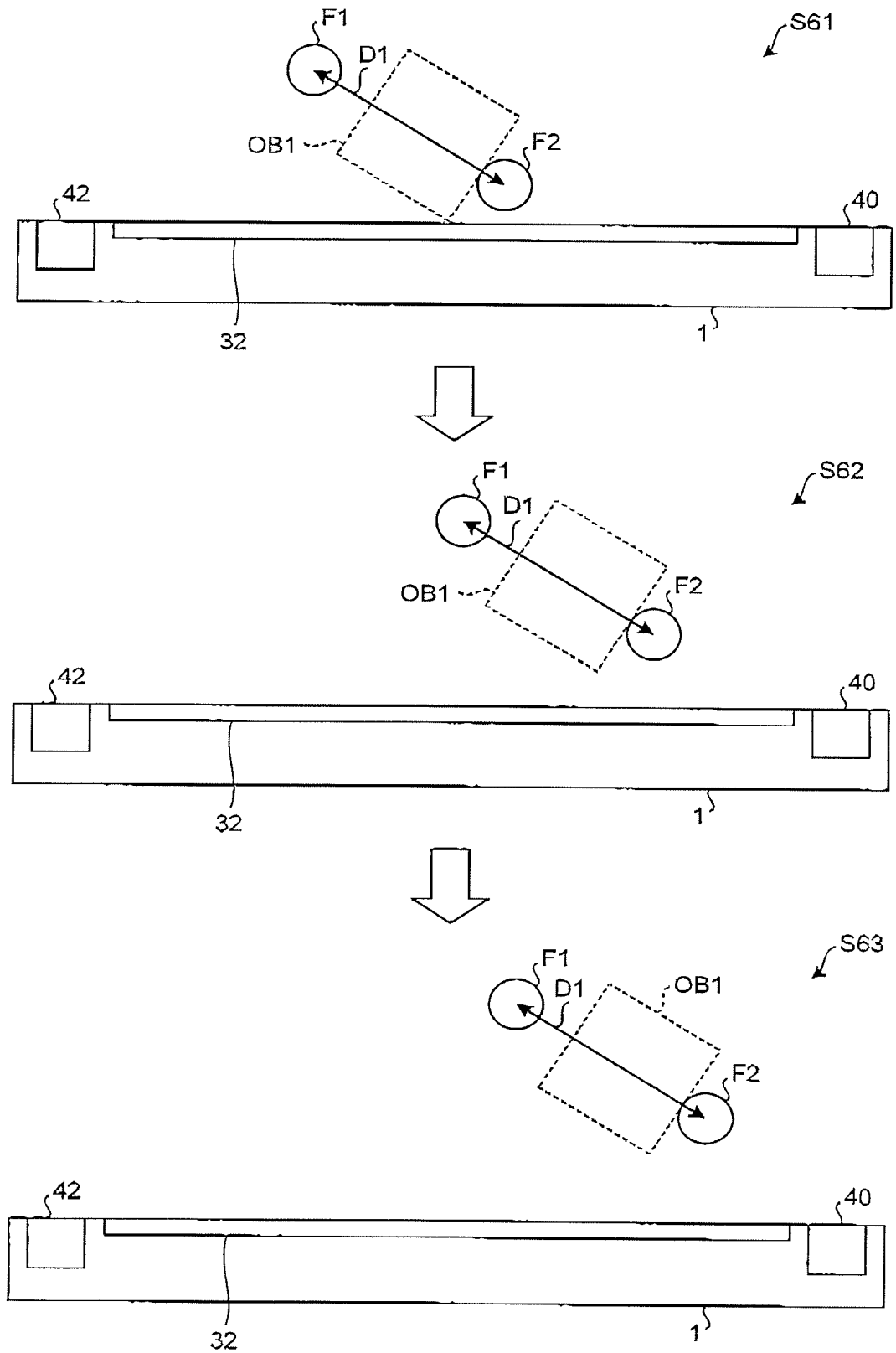
FIG. 25 is a diagram for explaining another example of how to detect an operation performed for the three-dimensional object.

As illustrated at Step S61 to Step S63 in FIG. 25, a state, in which at least one of the first object and the second object is brought into contact with the three-dimensional object and then the distance between the first object and the second object is maintained substantially constant for a longer period of time than the predetermined time, may be set as the condition for selecting the three-dimensional object. FIG. 25 is a diagram for explaining another example of how to detect an operation performed for the three-dimensional object. If a plurality of three-dimensional objects are closely displayed, by setting the contact with the three-dimensional object as the condition for the selection, the user can easily select a desired three-dimensional object.

Figure 26:
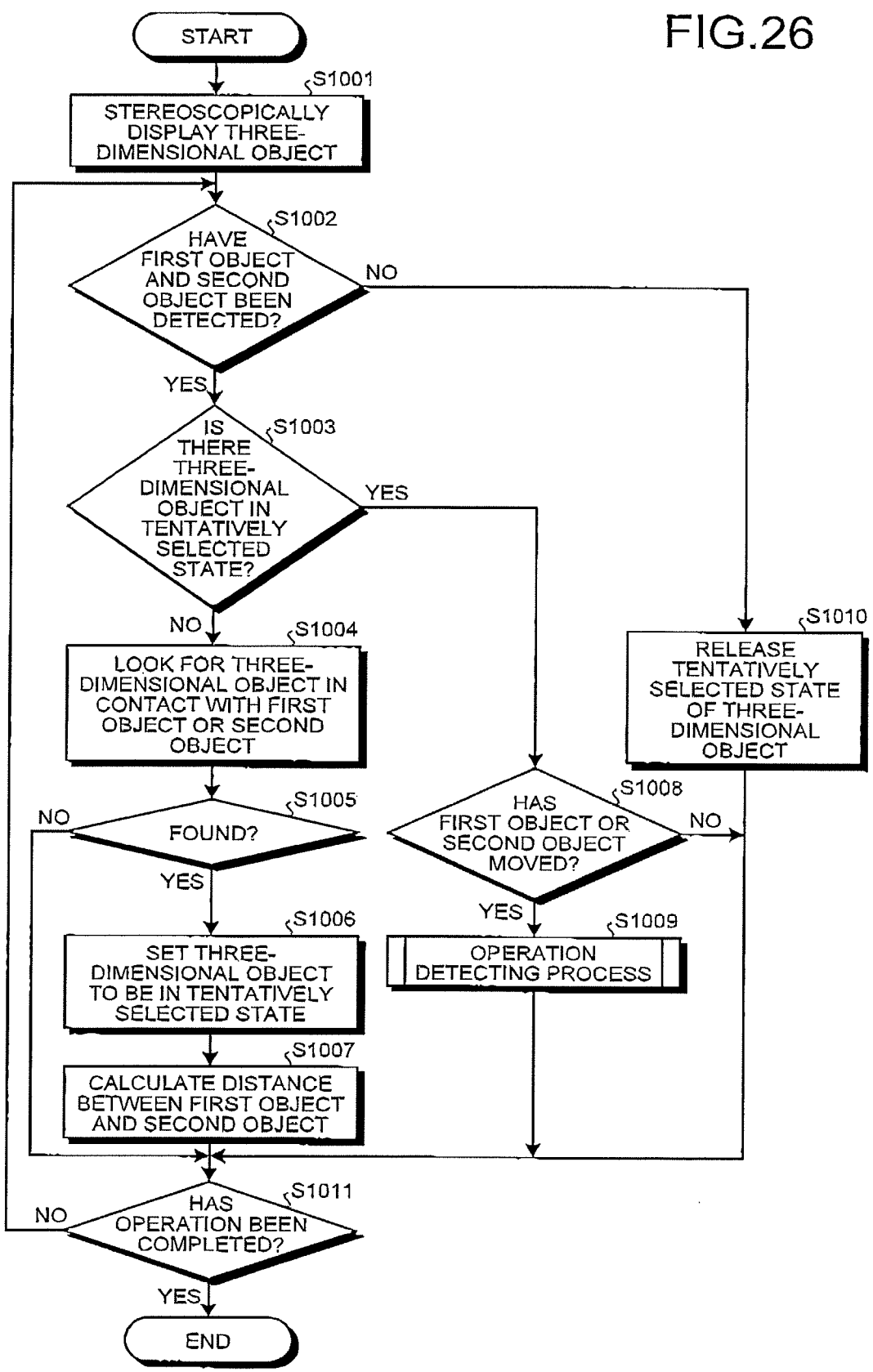
FIG. 26 is a flowchart of a procedure of the selection detecting process when a contact with the three-dimensional object is set as a condition for selection.

FIG. 26 is a flowchart of a procedure of the selection detecting process when the contact with the three-dimensional object is set as the condition for the selection. As illustrated in FIG. 26, first, at Step S1001, the control unit 22 stereoscopically displays a three-dimensional object. Specifically, in the present embodiment, the control unit 22 causes the display unit 32a to stereoscopically display the aggregation (three-dimensional object) of the cubes arranged along the three directions perpendicular to one another as illustrated in FIG. 4 and FIG. 5 in the three-dimensional space. That is, the control unit 22 controls the display unit 32a to stereoscopically display a three-dimensional puzzle (three-dimensional object) in the three-dimensional space.

Subsequently, at Step S1002, the control unit 22 determines whether the detectors, that is, the imaging units 40 and 42 have detected the first object and the second object. That is, the control unit 22 controls the detectors to detect the move of objects (including the first object and the second object) in the three-dimensional space. Specifically, in the present embodiment, as illustrated in FIG. 4, the control unit 22 controls the detectors to detect that objects (including the first object and the second object) are located in positions where the objects grasp the aggregation (which is grasped by one hand in FIG. 4). Further, as illustrated in FIG. 5, the control unit 22 controls the detectors to detect groups of objects grasping the aggregation (which is grasped by both hands in FIG. 5) at locations thereon. The control unit 22 may control the detectors to detect any object other than the groups of objects (e.g., user's free finger and other user's hand) as well as the groups of objects grasping the aggregation (which is grasped by both hands) at locations thereon.

When the first object and the second object have not been detected (No at Step S1002), then at Step S1010, the control unit 22 releases, if there is a three-dimensional object in the tentatively selected state, the tentatively selected state of the three-dimensional object.

The control unit 22 then determines at Step S1011 whether the operation completion has been detected. When the operation completion has been detected (Yes at Step S1011), the control unit 22 ends the selection detecting process. When the operation completion has not been detected (No at Step S1011), the control unit 22 re-executes Step S1002 and the subsequent steps.

When the first object and the second object have been detected (Yes at Step S1002), then at Step S1003, the control unit 22 determines whether there is a three-dimensional object in the tentatively selected state. When there is no three-dimensional object in the tentatively selected state (No at Step S1003), then at Step S1004, the control unit 22 looks for a three-dimensional object in contact with at least one of the first object and the second object, from among displayed three-dimensional objects-When there is no corresponding three-dimensional object (No at Step S1005), then at Step S1011, the control unit 22 determines whether the operation completion has been detected. When the operation completion has been detected (Yes at Step S1011), the control unit 22 ends the selection detecting process. When the operation completion has not been detected (No at Step S1011), the control unit 22 re-executes Step S1002 and the subsequent steps.

When the three-dimensional object in contact with at least one of the first object and the second object is found (Yes at Step S1005), then at Step S1006, the control unit 22 sets the three-dimensional object displayed between the first object and the second object to be in the tentatively selected state. The control unit 22 calculates, at Step S1007, a distance between the first object and the second object.

The control unit 22 then determines at Step S1011 whether the operation completion has been detected. When the operation completion has been detected (Yes at Step S1011), the control unit 22 ends the selection detecting process. When the operation completion has not been detected (No at Step S1011), the control unit 22 re-executes Step S1002 and the subsequent steps.

When the first object and the second object have been detected and there is a three-dimensional object in the tentatively selected state (Yes at Step S1003), then at Step S1008, the control unit 22 determines whether at least one of the first object and the second object has moved. When both the first object and the second object have not moved (No at Step S1008), then at Step S1011, the control unit 22 determines whether the operation completion has been detected. When the operation completion has been detected (Yes at Step S1011), the control unit 22 ends the selection detecting process. When the operation completion has not been detected (No at Step S1011), the control unit 22 re-executes Step S1002 and the subsequent steps.

When at least one of the first object and the second object has moved (Yes at Step S1008), then at Step S1009, the control unit 22 executes the operation detecting process illustrated in FIG. 24, and changes, during the execution, the three-dimensional object in the selected state according to the detected operation.

After the end of the operation detecting process, the control unit 22 determines at Step S1011 whether the operation completion has been detected. When the operation completion has been detected (Yes at Step S1011), the control unit 22 ends the selection detecting process. When the operation completion has not been detected (No at Step S1011), the control unit 22 re-executes Step S1002 and the subsequent steps.

A fourth embodiment will be explained below. The embodiments are configured to detect the objects that operate the three-dimensional object based on the images photographed by the imaging units; however, some other detection methods may be used. For example, a capacitive type touch sensor can detect a position of a finger that does not touch the touch sensor by increasing the sensitivity. Therefore, the fourth embodiment represents an example of using the touch sensor as a detector that detects objects operating a three-dimensional object. In the following explanation, the same signs as these of the already explained components are assigned to the same components as the already explained components. Explanation that overlaps with the above explanation may be omitted.

Figure 27:
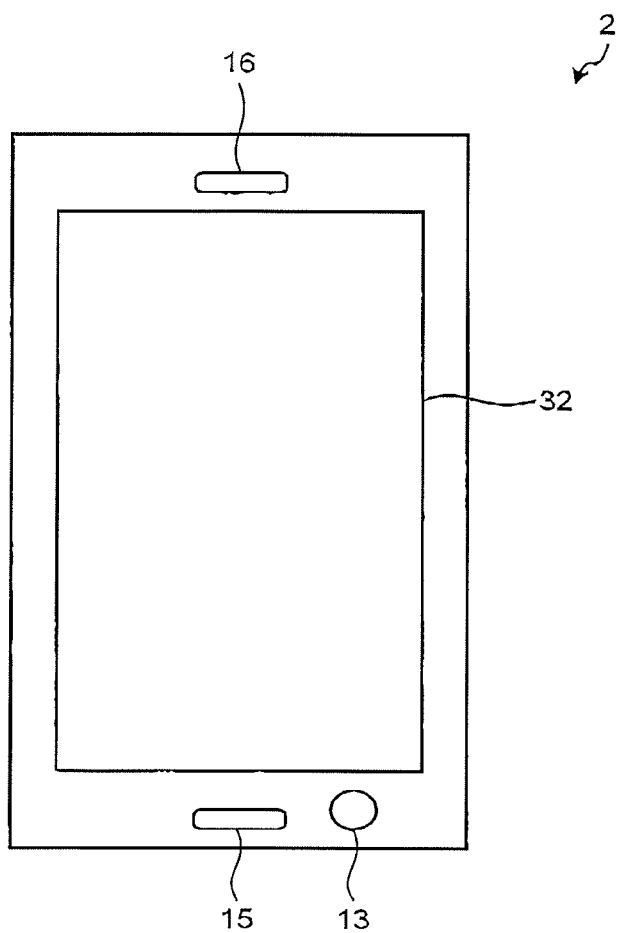
FIG. 27 is a front view of a mobile phone according to a fourth embodiment.
Figure 28:
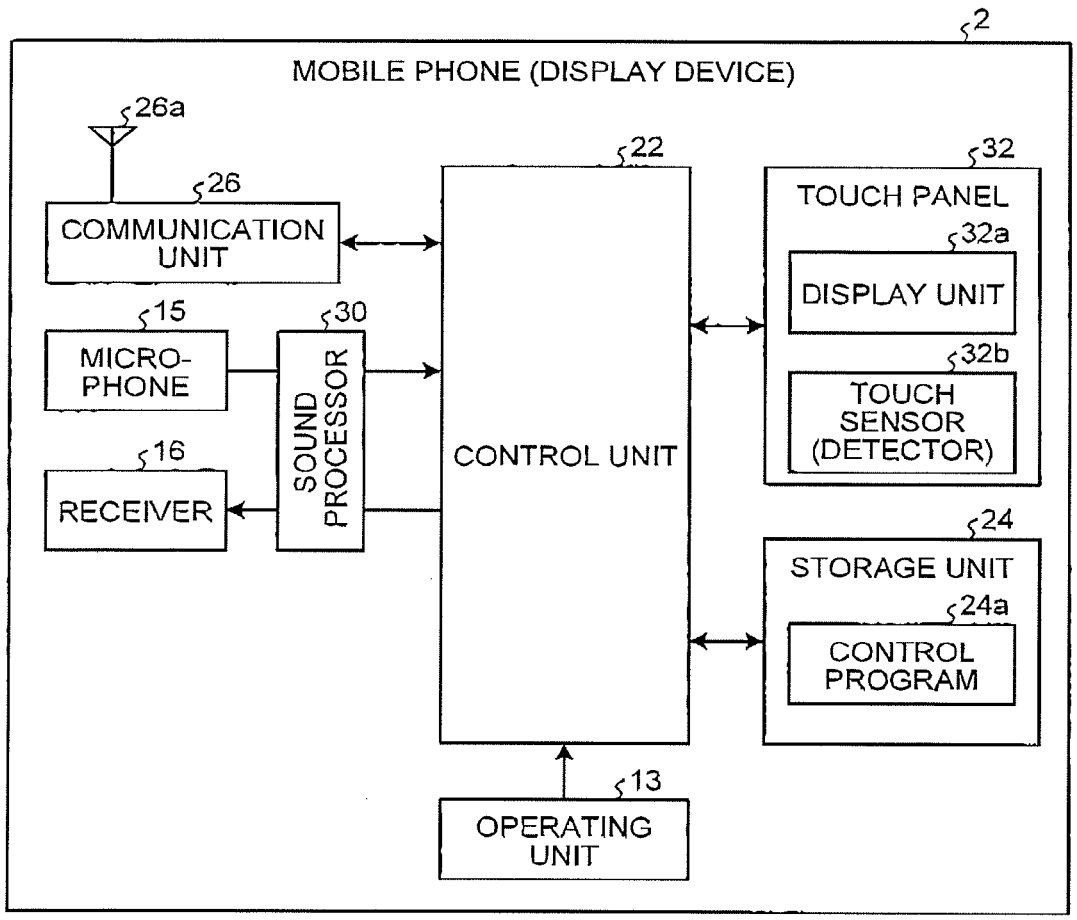
FIG. 28 is a block diagram of the mobile phone according to the fourth embodiment.

First of all, a configuration of a mobile phone (display device) 2 according to the fourth embodiment is explained below with reference to FIG. 27 and FIG. 28. FIG. 27 is a front view of the mobile phone 2. FIG. 28 is a block diagram of the mobile phone 2.

As illustrated in FIG. 27 and FIG. 28, the mobile phone 2 includes the operating unit 13, the microphone 15, the receiver 16, the control unit 22, the storage unit 24, the communication unit 26, the sound processor 30, and the touch panel 32.

The touch panel 32 displays various pieces of information such as characters, graphics, and images, and detects an input operation performed on a predetermined area such as displayed icon, button, and character input area. The touch panel 32 is structured with the display unit 32a and the touch sensor 32b so as to overlap each other. The touch sensor 32b according to the present embodiment is a capacitive type touch sensor. The touch sensor 32b functions also as a detector that detects fingers operating a three-dimensional object.

Figure 29:
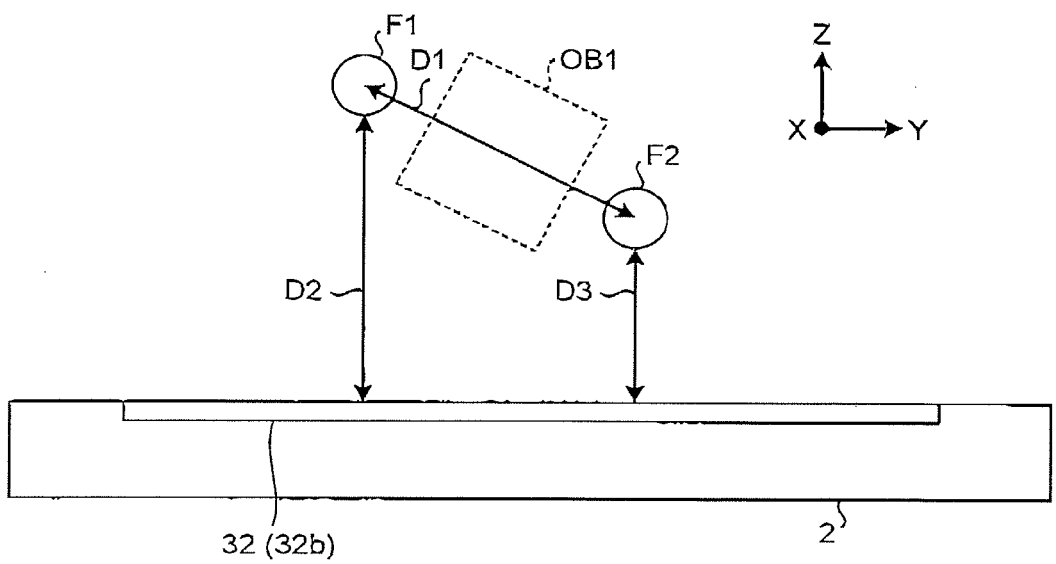
FIG. 29 is a diagram for explaining how to detect an operation performed for a three-dimensional object in the fourth embodiment.

Then, the detection of an operation performed for a three-dimensional object is explained with reference to FIG. 29. FIG. 29 is a diagram for explaining how to detect an operation performed for a three-dimensional object. As illustrated in FIG. 29, the touch panel 32 stereoscopically displays the three-dimensional object OB1 in the three-dimensional space.

It is assumed here that the user wishes to perform some operation on the three-dimensional object OB1. To perform some operation on the three-dimensional object OB1, first, the three-dimensional object OB1 has to be selected as an operation target. To select the three-dimensional object OB1, as illustrated in FIG. 29, the user moves the finger F1 and the finger F2 so that the three-dimensional object OB1 is located between the finger F1 and the finger F2.

The mobile phone 2 detects locations of the finger F1 and the finger F2 using the touch sensor 32b. The touch sensor 32b can detect the locations of the finger F1 and the finger F2 in an X-axis direction and a Y-axis direction by increasing its sensitivity even if, for example, a distance between the finger F1 or the finger F2 and the surface of the touch panel 32 in a Z-axis direction is about 10 cm. Moreover, the touch sensor 32b can detect a distance D2 of the finger F1 from the surface of the touch panel 32 in the Z-axis direction and also detect a distance D3 of the finger F2 from the surface of the touch panel 32 in the Z-axis direction based on the magnitude of the capacitance.

The mobile phone 2 can calculate the distance D1 between the finger F1 and the finger F2 and can determine whether the three-dimensional object is displayed between the finger F1 and the finger F2, based on the thus detected locations of the finger F1 and the finger F2 in the three-dimensional space. The control, after the detection of the display of the three-dimensional object between the finger F1 and the finger F2, is executed according to the procedure explained in any one of the first embodiment to the third embodiment.

As explained above, the fourth embodiment is configured to use the touch sensor as a detector, and therefore the operation performed for the three-dimensional object can be detected even by a display device with no imaging unit.

To detect the operation performed for the three-dimensional object, the imaging units and the touch sensor may be used in combination with each other. When the imaging units and the touch sensor are combined with each other, respective detection results may be averaged to specify the locations of the finger F1 and the finger F2. A weighted average may be used, such that weighting of the detection results of the touch sensor is increased in an area near the touch panel 32 where the imaging units 40 and 42 are difficult to acquire images of the finger F1 and the finger F2 and weighting of the detection results of the imaging units 40 and 42 is increased in an area far from the touch panel 32 where the detection precision of the touch sensor becomes low in an area far from the touch panel 32.

Figure 30:
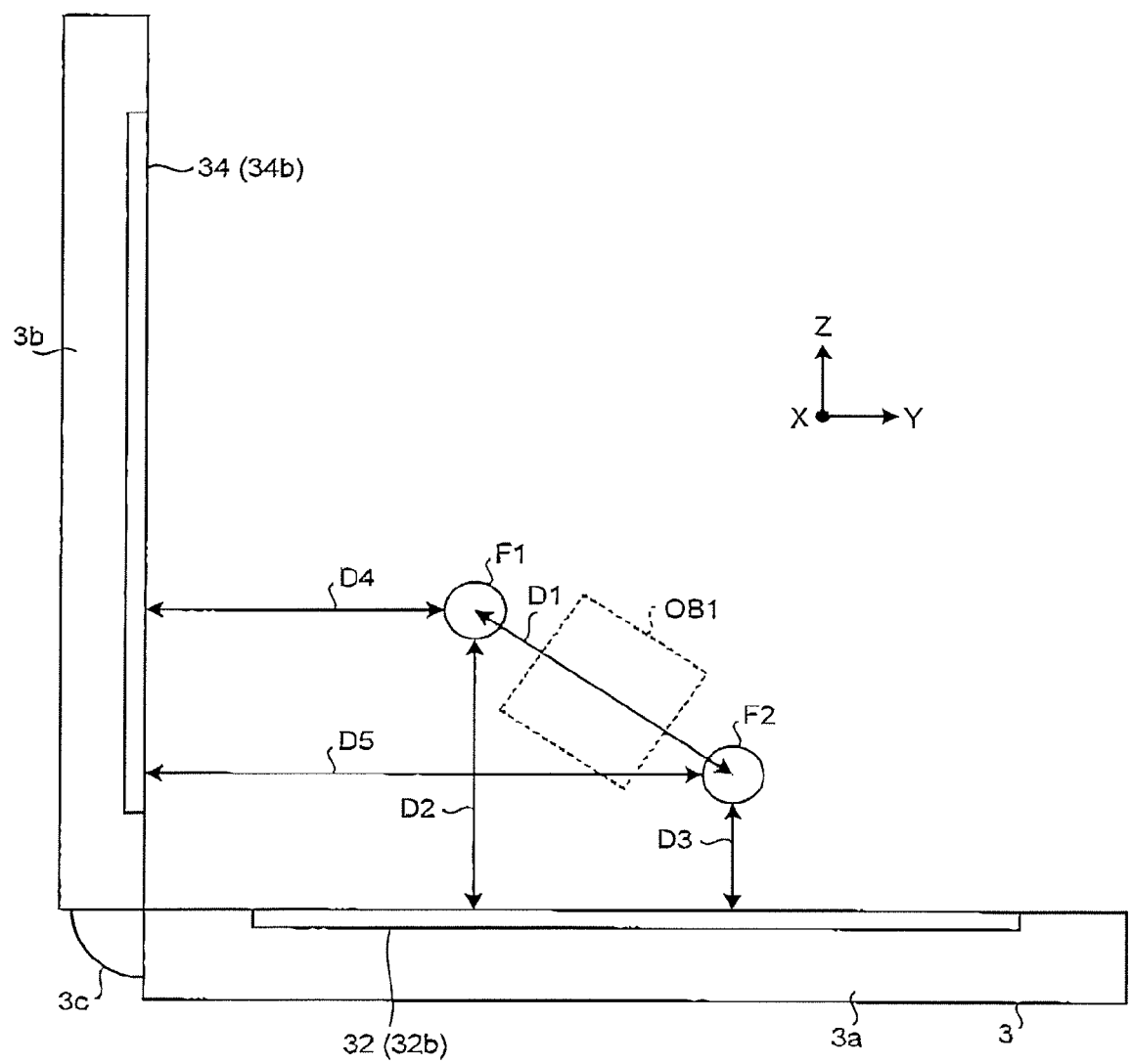
FIG. 30 is a diagram illustrating an example of a configuration of a mobile phone that detects an operation performed for a three-dimensional object using a plurality of touch sensors.

To prevent the touch sensor from not detecting a location of a finger with high precision because some other finger or so may block the finger, a plurality of touch sensors may be used to detect an operation performed for the three-dimensional object. FIG. 30 is a diagram of a configuration example of a mobile phone 3 that detects an operation performed for the three-dimensional object using a plurality of touch sensors.

The mobile phone 3 includes a first housing 3a, a second housing 3b, and a hinge 3c. The hinge 3c couples the first housing 3a and the second housing 3b so as to be openable and closable. The first housing 3a is provided with the touch panel 32 including the touch sensor 32b, and the second housing 3b is provided with a touch panel 34 including a touch sensor 34b. As illustrated in FIG. 30, the touch sensor 32b and the touch sensor 34b contact the three-dimensional space at different angles when the first housing 3a and the second housing 3b are fixed to each other at an angle of about 90 degrees.

The touch sensor 32b functions as a detector that detects locations of the finger F1 and the finger F2 in the X-axis direction and the Y-axis direction. The touch sensor 32b can also detect the distance D2 of the finger F1 from the surface of the touch panel 32 in the Z-axis direction and the distance D3 of the finger F2 from the surface of the touch panel 32 in the Z-axis direction, based on the magnitude of the capacitance.

The touch sensor 34b functions as a detector that detects locations of the finger F1 and the finger F2 in the X-axis direction and the Z-axis direction. The touch sensor 34b can also detect a distance D4 of the finger F1 from the surface of the touch panel 34 in the Y-axis direction and a distance D5 of the finger F2 from the surface of the touch panel 34 in the Y-axis direction, based on the magnitude of the capacitance.

In this manner, by detecting the finger F1 and the finger F2 from the different directions, even if there is any obstacle, the locations of the finger F1 and the finger F2 can be detected from either one of the directions. When the finger F1 and the finger F2 are to be detected from the different directions, one of the touch panels displays the three-dimensional object, and the other touch panel may stop displaying or may two-dimensionally display guidance or so. Moreover, it may be configured that the touch panel that does not display the three-dimensional object functions as a mere touch sensor.

According to the embodiments, the following becomes possible. When an object such as a hand enters into any three-dimensional space (object area) upon the selection of the three-dimensional object according to the embodiments, the three-dimensional object is moved or changed, and this enables to produce an action linked to the real world to a certain extent. In the case of the game, the hand can be intentionally removed from the three-dimensional space. In the embodiments, it is detected that the object such as the hand is placed at a location near a targeted three-dimensional object for the given time or more, and therefore the three-dimensional object can be deformed or moved together with the subsequent move of the hand. When a plurality of three-dimensional objects are present and distances from the hand to the respective three-dimensional objects are the same as each other, one of the three-dimensional objects can be selected by making a determination based on which side a user's palm faces or by making a determination based on respective moves of the three-dimensional objects. Namely, the selection can be performed by detecting which of the three-dimensional objects the palm approaches. In the embodiments, after the selection of the three-dimensional object, the selected three-dimensional object is deformed or moved based on a specific input signal, and, in addition thereto, the user may select the three-dimensional object by pointing thereto or directing his/her voice or glance thereto, or the like. In this case, it is assumed that after the specification of the three-dimensional object, the three-dimensional object can be moved by the movement amount of the hand even if the object such as the hand is not necessarily in the three-dimensional space (object area).

For deformation or movement of the three-dimensional object according to the embodiments, the action on the three-dimensional object can be changed by an area and a location of the object in contact with the three-dimensional object. Thus, for example, the action can be changed by pressing it with the finger or by pressing it with the palm. In this case, the action can be changed in consideration of friction or the like depending on which location (e.g., what kind of thing) the three-dimensional object is placed on. In this case, if the hand is placed on any location other than the three-dimensional object, by virtually displaying the hand on the location of the three-dimensional object, the area and the location of the object in contact with the three-dimensional object can be adjusted. Namely, the finger is not necessarily placed on the location of the three-dimensional object. Moreover, in the embodiments, the contents of deformation or movement can be changed depending on the three-dimensional object. For example, it can be configured so that when the three-dimensional object is made of a soft material, then it is deformed by being pressed, and when a hard material, then the entire three-dimensional object is moved. In this case, it can be configured so that when a speed of the hand coming in contact with the three-dimensional object is high, then it is deformed, and when the speed is slow, then the entire three-dimensional object is moved. In the embodiments, the deformation/the movement is basically the main process performed for the three-dimensional object. However, like a candle, a lighter, or the like, by pressing it, it is possible to generate an action such that the three-dimensional object disappears or appears. In the embodiments, it is also possible to reflect a gravity-adjusted deformation/movement result to the three-dimensional object.

As for the release of the three-dimensional object according to the embodiments, by detecting that the finger being the object deviates from a surface position (coordinates) of the three-dimensional object, the three-dimensional object can be released. In the embodiments, by notifying the release of the three-dimensional object with sound, the three-dimensional object can also be released.

Examples of the application of the display device explained in the embodiments and modified examples thereof are explained below. The change applied to the three-dimensional object according to the detected operation is not limited to the movement, the rotation, the deformation, the deletion, or the like. The operation detected in the operation detecting process and the change applied to the three-dimensional object according to the operation are not limited to the embodiments, and may therefore be changed according to the type of the three-dimensional object.

The aspects of the present invention represented in the embodiments can be arbitrarily modified without departing from the spirit of the present invention. Moreover, the embodiments may be combined with each other as required. For example, the control program 24a represented in the embodiments may be divided into a plurality of modules or may be integrated with any other program. In the embodiments, the fingers are used to operate the three-dimensional object; however, a stick-like object or so of which end is charged with static electricity may be used instead of the fingers.

The embodiments represent the example of using the imaging units and the touch sensor as the detector in order to detect the three-dimensional object; however, the detector is not limited thereto. For example, a sensor (TOF sensor) using a Time-of-Flight (TOF) method may be used instead of the imaging unit. In addition, when a proximity sensor or the like capable of detecting a movement of the three-dimensional object in a planar direction of the three-dimensional space is disposed substantially horizontally with respect to a moving direction of the object, displacement of the object can be detected even in a noncontact manner, and therefore these devices may also be used. It is preferable that the displacement of the object can be detected without providing the sensor or the like in the object. If the sensor or the like is not provided in the object, then there is no need to attach an acceleration sensor to the finger or to move a display device itself with an acceleration sensor, which leads to cost reduction.

The embodiments have explained the case where the three-dimensional object projects toward the user side; however, the present invention is also applicable to a case of showing the three-dimensional object as if it is present in a deeper side than the display unit. In this case, a sensor and a camera may be provided in the back side of the display unit. When the display device is a mobile phone, many mobile phones are provided with an in-camera for imaging the user himself/herself and an out-camera for imaging landscapes and the like. Therefore, it may be configured to capture the displacement of the object in the back side by using the out-camera.

The embodiments have explained the examples of detecting the operations performed for the three-dimensional object; however, the present invention can also be used for detecting an operation performed for a two-dimensional object. For example, when touches of the fingers on both sides of an icon displayed on the touch panel are detected, and, thereafter, if this state is maintained for a longer period of time than a predetermined time, or if the distance between the fingers is maintained substantially constant for a longer period of time than a predetermined time, then the icon may be set in the selected state.

The embodiments are configured that the display device singly detects an operation performed for the three-dimensional object; however, the display device may collaborate with a server to detect an operation performed for the three-dimensional object. In this case, the display device successively transmits information detected by the detectors to the server, and the server detects the operation to notify the display device of the detection results. In other words, in the embodiments, the control unit 22 performs the selection detecting process and the operation detecting process for the three-dimensional object by using the control program 24a stored in the storage unit 24; however, the present invention is not limited thereto. The display device may execute various calculation processes using a server communicable through the communication unit 26. Namely, the calculation process itself may be externally performed. In this case, the display device performs transmission of information detected by the detector to the server and reception of data after the calculation process from the server. In this way the server performs the calculation or so, and this enables the load on the display device to be reduced. Namely, the server and the display device may be set as one control system to perform the processes. Such a configuration as above enables the load on the display device to be reduced.

The regular polyhedral three-dimensional puzzle may be a regular tetrahedral three-dimensional puzzle, a regular hexahedral three-dimensional puzzle, a regular octahedral three-dimensional puzzle, a regular dodecahedral three-dimensional puzzle, or a regular icosahedral three-dimensional puzzle.

The advantages are that one embodiment of the invention provides a display device, a control system, and a storage medium storing therein a control program that can provide a more convenient operation method in 3D application to users.

What is claimed is:

1. A display device comprising:
a display unit configured to stereoscopically display an aggregation of a plurality of cubes in a three-dimensional space, the cubes being arranged along three directions perpendicular to one another;
a detecting unit configured to detect moves of objects in the three-dimensional space; and
a control unit configured to change a location of each of the cubes according to a detection result of the detecting unit,
wherein the aggregation has six faces each of which is formed from surfaces of the cubes, each of the surfaces of the cubes being provided with indication, and
the control unit is configured to rotate the cubes arranged along the face perpendicular to a first direction, among the three directions, around an axis along the first direction such that the surfaces of the cubes keep a positional relationship in the face perpendicular to the first direction and change places with each other in the faces perpendicular to a second direction or a third direction among the three directions,
wherein the display unit is configured to stereoscopically display a plurality of aggregations in the three-dimensional space, and
the control unit is configured to determine, when the detecting unit detects that groups of objects grasping a first aggregation, among the aggregations, at locations thereon relatively rotate around an axis along a direction in which the group of objects face each other, the direction in which the groups of objects face each other as the first direction, and to rotate the cubes of the first aggregation together with the cubes of a second aggregation, among the aggregations, according to a rotation amount by which the groups of objects relatively rotate, and
wherein the display unit is configured to stereoscopically display the aggregations in such a manner that the first aggregation is nested in the second aggregation, and
the control unit is configured to move, when the objects located in such positions that the first aggregation is sandwiched therebetween move, the first aggregation without moving the second aggregation according to moves of the objects with respect to the first aggregation.

2. The display device according to claim 1, wherein,
the control unit is configured to change, when the detecting unit detects that the objects are located in such positions that the aggregation is sandwiched therebetween, and that the objects have moved, the location of each of the cubes according to the move of the objects.

3. The display device according to claim 1, wherein,
the control unit is configured to determine, when the detecting unit detects that groups of objects grasping the aggregation at locations thereon relatively rotate around an axis along a direction in which the group of objects face each other, the direction in which the groups of objects face each other as the first direction, and to rotate the cubes according to a rotation amount by which the groups of objects relatively rotate.

4. The display device according to claim 1, wherein
the detecting unit includes a capacitive type touch sensor provided on the display unit in an overlapped manner.

5. The display device according to claims 1, wherein
the detecting unit includes either one of a camera and a Time-of-Flight (TOF) sensor.

6. The display device according to claim 1, wherein the display unit is configured to display a time limit.

7. The display device according to claim 1, wherein the display unit is configured to displays the number of times of rotations during which the cubes have been rotated.

8. A display device comprising:
a display unit configured to stereoscopically display an aggregation of a plurality of cubes in a three-dimensional space, the cubes being arranged along three directions perpendicular to one another;
a detecting unit configured to detect moves of objects in the three-dimensional space; and
a control unit configured to change a location of each of the cubes according to a detection result of the detecting unit,
wherein the aggregation has six faces each of which is formed from surfaces of the cubes, each of the surfaces of the cubes being provided with indication, and
the control unit is configured to rotate the cubes arranged along the face perpendicular to a first direction, among the three directions, around an axis along the first direction such that the surfaces of the cubes keep a positional relationship in the face perpendicular to the first direction and change places with each other in the faces perpendicular to a second direction or a third direction among the three directions,
wherein the display unit is configured to stereoscopically display a plurality of aggregations in the three-dimensional space, and
the control unit is configured to determine, when the detecting unit detects that groups of objects grasping a first aggregation, among the aggregations, at locations thereon relatively rotate around an axis along a direction in which the group of objects face each other, the direction in which the groups of objects face each other as the first direction, and to rotate the cubes of the first aggregation together with the cubes of a second aggregation, among the aggregations, according to a rotation amount by which the groups of objects relatively rotate, and
wherein the display unit is configured to separately display the first aggregation and the second aggregation in the one three-dimensional space, and
the control unit is configured to move, when the objects located in such positions that the second aggregation is sandwiched therebetween move, the first aggregation together with the second aggregation according to moves of the objects with respect to the second aggregation.

9. A display device, comprising:
a display unit configure to stereoscopically display a three-dimensional puzzle in a three-dimensional space having three directions perpendicular to one another;
a detecting unit configure to detect moves of objects in the three-dimensional space; and
a control unit configure to change a location of each of pieces of the three-dimensional puzzle according to a detection result of the detecting unit,
wherein the three-dimensional puzzle has six faces each of which is formed from surfaces of the pieces, each of the surfaces of the pieces being provided with indication, and
the control unit is configured to rotate the pieces arranged along the face perpendicular to a first direction, among the three directions, around an axis along the first direction such that the surfaces of the pieces keep a positional relationship in the face perpendicular to the first direction and change places with each other in the faces perpendicular to a second direction or a third direction among the three directions,
wherein the display unit is configured to stereoscopically display a plurality of three-dimensional puzzles in the three-dimensional space, and
the control unit is configured to determine, when the detecting unit detects that groups of objects grasping a first three-dimensional puzzle, among the three-dimensional puzzles, at locations thereon relatively rotate around an axis along a direction in which the group of objects face each other, the direction in which the groups of objects face each other as the first direction, and to rotate the pieces of the first three-dimensional puzzle together with the pieces of a second three-dimensional puzzle, among the three-dimensional puzzles, according to a rotation amount by which the groups of objects relatively rotate, and
wherein the display unit is configured to stereoscopically display the three-dimensional puzzles in such a manner that the first three-dimensional puzzle is nested in the second three-dimensional puzzle, and
the control unit is configured to move, when the objects located in such positions that the first three-dimensional puzzle is sandwiched therebetween move, the first three-dimensional puzzle without moving the second three-dimensional puzzle according to moves of the objects with respect to the first three-dimensional puzzle.

10. The display device according to claim 9, wherein the three-dimensional puzzle is a regular polyhedral three-dimensional puzzle.

11. The display device according to claim 10, wherein the regular polyhedral three-dimensional puzzle includes a regular tetrahedral three-dimensional puzzle, a regular hexahedral three-dimensional puzzle, a regular octahedral three-dimensional puzzle, a regular dodecahedral three-dimensional puzzle, or a regular icosahedral three-dimensional puzzle.

12. The display device according to claim 11, wherein the regular hexahedral three-dimensional puzzle includes a Pocket Cube, a Rubik's Cube, a Rubik's Revenge, and a Professor's Cube.

13. A control system, comprising:
a mobile device; and
a control device, wherein
the mobile device includes
a display unit configured to stereoscopically display an aggregation of a plurality of cubes in a three-dimensional space, the cubes being arranged along three directions perpendicular to one another, and
a detecting unit configured to detect moves of objects in the three-dimensional space, and
the control device includes a control unit configured to change a location of each of the cubes according to a detection result of the detecting unit,
wherein the aggregation has six faces each of which is formed from surfaces of the cubes, each of the surfaces of the cubes being provided with indication, and
the control unit is configured to rotate the cubes arranged along the face perpendicular to a first direction, among the three directions, around an axis along the first direction such that the surfaces of the cubes keep a positional relationship in the face perpendicular to the first direction and change places with each other in the faces perpendicular to a second direction or a third direction among the three directions, wherein the display unit is configured to stereoscopically display a plurality of aggregations in the three-dimensional space, and the control unit is configured to determine, when the detecting unit detects that groups of objects grasping a first aggregation, among the aggregations, at locations thereon relatively rotate around an axis along a direction in which the group of objects face each other, the direction in which the groups of objects face each other as the first direction, and to rotate the cubes of the first aggregation together with the cubes of a second aggregation, among the aggregations, according to a rotation amount by which the groups of objects relatively rotate, and wherein the display unit is configured to stereoscopically display the aggregations in such a manner that the first aggregation is nested in the second aggregation, and the control unit is configured to move, when the objects located in such positions that the first aggregation is sandwiched therebetween move, the first aggregation without moving the second aggregation according to moves of the objects with respect to the first aggregation.

14. A non-transitory storage medium that stores a control program for causing, when executed by a display device including a display unit and a detecting unit, the display device to execute:

stereoscopically displaying an aggregation of a plurality of cubes in a three-dimensional space by the display unit, the cubes being arranged along three directions perpendicular to one another;

detecting moves of objects in the three-dimensional space by the detecting unit; and changing a location of each of the cubes according to a detection result of the detecting unit, wherein the aggregation has six faces each of which is formed from surfaces of the cubes, each of the surfaces of the cubes being provided with indication, and the control program, when executed, further causes the display device to execute rotating the cubes arranged along the face perpendicular to a first direction, among the three directions, around an axis along the first direction such that the surfaces of the cubes keep a positional relationship in the face perpendicular to the first direction, and change places with each other in the faces perpendicular to a second direction or a third direction among the three directions, displaying a plurality of aggregations in the three-dimensional space by the display unit, and determining, when the detecting unit detects that groups of objects grasping a first aggregation, among the aggregations, at locations thereon relatively rotate around an axis along a direction in which the group of objects face each other, the direction in which the groups of objects face each other as the first direction, and rotating the cubes of the first aggregation together with the cubes of a second aggregation, among the aggregations, according to a rotation amount by which the groups of objects relatively rotate, stereoscopically displaying the aggregations by the display unit in such a manner that the first aggregation is nested in the second aggregation, and moving, when the objects located in such positions that the first aggregation is sandwiched therebetween move, the first aggregation without moving the second aggregation according to moves of the objects with respect to the first aggregation.

* * * * *